United States Patent
Krueger

(10) Patent No.: US 11,604,733 B1
(45) Date of Patent: Mar. 14, 2023

(54) LIMITING ALLOCATION OF WAYS IN A CACHE BASED ON CACHE MAXIMUM ASSOCIATIVITY VALUE

(71) Applicant: Arm Limited, Cambridge (GB)

(72) Inventor: Steven Douglas Krueger, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/515,661

(22) Filed: Nov. 1, 2021

(51) Int. Cl.
*G06F 12/0864* (2016.01)
*G06F 12/0846* (2016.01)
*G06F 12/0871* (2016.01)

(52) U.S. Cl.
CPC ...... *G06F 12/0864* (2013.01); *G06F 12/0848* (2013.01); *G06F 12/0871* (2013.01)

(58) Field of Classification Search
CPC ............. G06F 12/0848; G06F 12/0864; G06F 12/0871
See application file for complete search history.

(56) References Cited

U.S. PATENT DOCUMENTS

| | | | | |
|---|---|---|---|---|
| 8,364,897 | B2 * | 1/2013 | Desai | G06F 12/0864 711/E12.017 |
| 9,811,468 | B2 * | 11/2017 | Hooker | G06F 12/0864 |
| 9,910,785 | B2 * | 3/2018 | Hooker | G06F 12/0882 |
| 2014/0129778 | A1 | 5/2014 | Duggins | |
| 2014/0181410 | A1 * | 6/2014 | Kalamatianos | G06F 12/121 711/133 |
| 2014/0201452 | A1 | 7/2014 | Meredith | |
| 2015/0026407 | A1 * | 1/2015 | McLellan | G06F 12/0864 711/128 |
| 2018/0203610 | A1 | 7/2018 | Krueger | |
| 2018/0203807 | A1 | 7/2018 | Krueger | |

OTHER PUBLICATIONS

Arm Manual, "Arm Architecture Reference Manual Supplement", Memory System Resource Partitioning and Monitoring (MPAM), for ARMv8-A, release date: Oct. 30, 2018, 266 pages.
(Continued)

*Primary Examiner* — Aracelis Ruiz
(74) *Attorney, Agent, or Firm* — Nixon & Vanderhye P.C.

(57) ABSTRACT

An apparatus has processing circuitry to perform data processing, at least one architectural register to store at least one partition identifier selection value which is programmable by software processed by the processing circuitry; a set-associative cache comprising a plurality of sets each comprising a plurality of ways; and partition identifier selecting circuitry to select, based on the at least one partition identifier selection value stored in the at least one architectural register, a selected partition identifier to be specified by a cache access request for accessing the set-associative cache. The set-associative cache comprises: selecting circuitry responsive to the cache access request to select, based on the selected partition identifier, a selected cache maximum associativity value; and allocation control circuitry to limit a number of ways allocated in a same set for information associated with the selected partition identifier to a maximum number of ways determined based on the selected cache maximum associativity value.

18 Claims, 10 Drawing Sheets

(56) References Cited

OTHER PUBLICATIONS

Online, Khang N., "Benefits of Intel Cache Monitoring Technology in Intel Xeon Processor E5 v3 Family", submitted Sep. 8, 2014, 2 pages—printed Jul. 11, 2016.

Intel, "Improving Real-Time Performance by Utilizing Cache Allocation Technology", Enhancing Performance via Allocation of the Processor's Cache, White Paper, Apr. 2015, 16 pages.

Online, Khang N., "Introduction to Cache Allocation Technology in Intel Xeon Processor E5 v4 Family", submitted Feb. 11, 2016, 4 pages—printed Jul. 11, 2016.

Online, Khang N., "Introduction to Memory Bandwith Monitoring in Intel Xeon Processor E5 v4 Family", submitted Feb. 11, 2016, 3 pages—printed Jul. 11, 2016.

\* cited by examiner

MaxAssoc F[A] = 67%
Int (W x F[A]) = 5
Int (S x Frac (W x F[A])) = 42
→ Max 42 sets allowed to allocate
    6 ways for partition ID A

LIMITING ALLOCATION OF WAYS IN A CACHE BASED ON CACHE MAXIMUM ASSOCIATIVITY VALUE

BACKGROUND

Technical Field

The present technique relates to the field of data processing.

Technical Background

Two or more software execution environments, such as applications or virtual machines, may be executed on the same data processing system with access to a common memory system shared between software execution environments. For some systems it may be important that the performance of one software execution environment is not held back due to another software execution environments using too much resource in the shared memory system. This problem can be referred to as the "noisy neighbour" problem and can be particularly significant for enterprise networking or server systems for example.

SUMMARY

At least some examples provide an apparatus comprising: processing circuitry to perform data processing; at least one architectural register to store at least one partition identifier selection value which is programmable by software processed by the processing circuitry; a set-associative cache comprising a plurality of sets each comprising a plurality of ways; and partition identifier selecting circuitry to select, based on the at least one partition identifier selection value stored in the at least one architectural register, a selected partition identifier to be specified by a cache access request for accessing the set-associative cache; the set-associative cache comprising: selecting circuitry responsive to the cache access request specifying the selected partition identifier to select, based on the selected partition identifier, a selected cache maximum associativity value associated with the selected partition identifier; and allocation control circuitry to limit a number of ways allocated in a same set for information associated with the selected partition identifier to a maximum number of ways determined based on the selected cache maximum associativity value; in which: when new information is to be allocated to a target set of the set-associative cache in response to the cache access request, the allocation control circuitry is configured to select, from among the plurality of ways of the target set, a replacement way to be allocated with the new information; and when the selected cache maximum associativity value indicates that the maximum number of ways is greater than zero and less than a total number of ways in the target set, and none of the plurality of ways of the target set are already allocated for information associated with the selected partition identifier, the allocation control circuitry is configured to select which particular way of the target set is the replacement way unconstrained by the selected cache maximum associativity value.

At least some examples provide a method comprising: performing data processing using processing circuitry; selecting, based on at least one partition identifier selection value stored in at least one architectural register, a selected partition identifier to be specified by a cache access request for accessing a set-associative cache, wherein the at least one partition identifier selection value is programmable by software processed by the processing circuitry, and the set-associative cache comprises a plurality of sets each comprising a plurality of ways; in response to the cache access request specifying the selected partition identifier, selecting, based on the selected partition identifier, a selected cache maximum associativity value associated with the selected partition identifier; and limiting a number of ways allocated in a same set for information associated with the selected partition identifier to a maximum number of ways determined based on the selected cache maximum associativity value; in which: when new information is to be allocated to a target set of the set-associative cache in response to the cache access request, a replacement way to be allocated with the new information is selected from among the plurality of ways of the target set, wherein when the selected cache maximum associativity value indicates that the maximum number of ways is greater than zero and less than a total number of ways in the target set, and none of the plurality of ways of the target set are already allocated for information associated with the selected partition identifier, selection of which particular way of the target set is the replacement way is unconstrained by the selected cache maximum associativity value.

Further aspects, features and advantages of the present technique will be apparent from the following description of examples, which is to be read in conjunction with the accompanying drawings.

DESCRIPTION OF EXAMPLES

Figure 1:
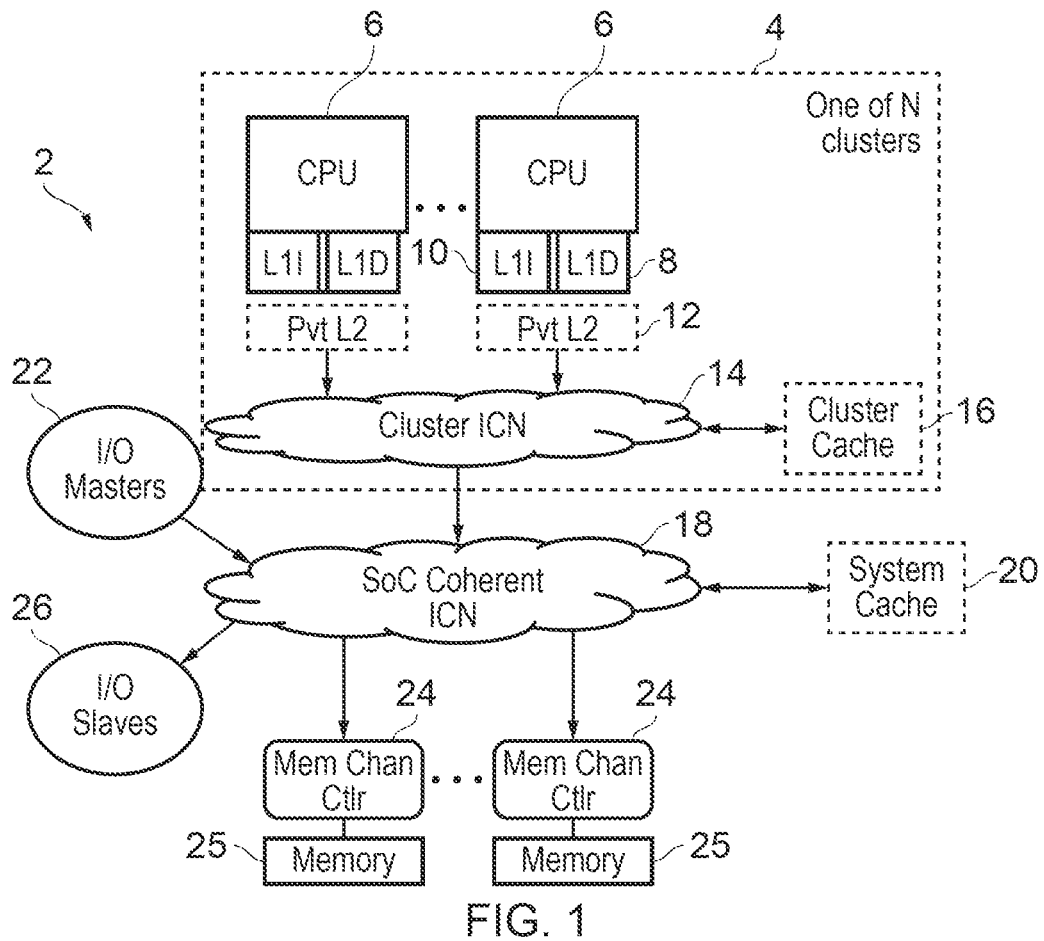
FIG. 1 illustrates an example of a data processing system including at least one cache.

An apparatus has processing circuitry to perform data processing, at least one architectural register to store at least one partition identifier selection value which is programmable by software processed by the processing circuitry, and partition identifier selecting circuitry to select, based on the at least one partition identifier selection value stored in the at least one architectural register, a selected partition identifier to be specified by a cache access request. By using a programmable value stored in an architectural register to control selection of a partition identifier assigned to a cache access request, the processing circuitry may present the partition identifier as a label for a cache access request, where that label can be set to a value which depends on the software issuing the transaction (e.g. the partition identifier selection value may be updated when switching between different software execution environments). The cache can use that label to control resource allocation, which can be useful for helping to avoid one software execution environment taking more than its fair share of resource, to address the noisy neighbour problem described above.

The apparatus may have a set-associative cache which comprises a certain number of sets of entries, each set comprising a number of ways. For a set-associative cache, information corresponding to a particular address may be allocated to any way within a specific set selected based on the address and may not be allocated to ways in other sets. Set-associative cache structures can help to reduce the overhead of looking up the cache compared to alternatives such as a fully-associative cache.

The set-associative cache may comprise selecting circuitry, which, in response to the cache access request that specifies the selected partition identifier, uses the selected partition identifier to select a selected cache maximum associativity value associated with the selected partition identifier. Allocation control circuitry of the set-associative cache limits the number of ways that can be allocated in a same set for information associated with the selected partition identifier to a certain maximum number of ways determined based on the selected cache maximum associativity value. Hence, the cache maximum associativity value can be used to assign, for the particular selected partition identifier, a certain limit on the number of ways that can be allocated for information associated with that partition identifier, which can help to avoid one software execution environment using up all of the ways in the same set which would then restrict other software's ability to allocate information into the set-associative cache for other addresses which map to the same set.

This approach contrasts with an alternative approach which could be to define an overall limit on the total number of entries of the set-associative cache (across the cache as a whole) which may be allocated for information associated with a particular partition identifier. With this alternative approach then the number of ways that can be allocated in the same set would not be limited because it would be permitted to allocate all of the ways in the same set for information associated with the selected partition identifier if the limit on the total number of cache entries allocatable for that partition identifier is greater than the number of ways in one set. However, a problem with applying the capacity limit globally for the cache as a whole is that even if a particular partition identifier's usage is below the capacity limit that partition may already have allocated all of the ways within a particular set, and this may impact on the ability for other software execution environments to allocate information into a cache for addresses mapping to that set. For example, if there is a "quieter" software execution environment which generates less frequent access requests than another, the "noisy" software execution environment which generates a greater frequency of accesses may keep allocating all the ways in a particular set, and this may severely limit the ability for the quieter software execution environment to allocate information to the cache for long enough that the information is still present the next time that quieter software execution environment needs it, which may affect performance.

In contrast, with the cache maximum associativity value, the limit on allocation represented by the cache maximum associativity value is applied separately for each set of the set-associative cache, rather than globally for the cache as a whole, and so this means that the control over allocation can be more effective in ensuring that software corresponding to a particular partition identifier does not monopolise all of the ways in one set.

In the examples discussed below, when new information is to be allocated to a target set of the set-associative cache in response to the cache access request, the allocation control circuitry may select, from among the ways of the target set, a replacement way to be allocated with new information. The selection of the replacement way may be such that, when the selected cache maximum associativity value indicates that the maximum number of ways for the selected partition identifier is greater than zero and less than a total number of ways in the target set, and none of the ways of the target set have already been allocated for information associated with the selected partition identifier, the allocation control circuitry may select which particular way of the target set is the replacement way unconstrained by the selected cache maximum associativity value. Hence, the cache maximum associativity value may represent a threshold limiting the maximum number of ways within one set that is allowed to be allocated for a particular partition identifier, but does not restrict which particular ways can be allocated for that partition identifier, at least in cases where no ways of the target sets have already been allocated for that partition identifier. This contrasts with an alternative approach which could be to define a bitmap or mask which indicates individual ways as either being allocatable or not allocatable for a particular identifier. Using a bitmap or mask to constrain replacement way selection can be less desirable because it can mean that sometimes the way selected as a replacement way may not be the way which, when considering other criteria (e.g. based on replacement policy information used to predict which way may be least likely to be accessed again in the near future), may be preferred for selection as the replacement way. Hence, on average when using a cache portion mask or bitmap the cache hit rate may reduce compared to an unconstrained selection, as sometimes it may result in the replacement way being selected to be a way that would be more likely to be accessed again than another way that could not be selected. In contrast, when using a cache maximum associativity value to limit the maximum number of allocatable ways in a given set for a particular partition identifier, without constraining which particular way can be selected as a replacement way in cases where no ways have already been allocated, this means that there is a wider selection of ways available for selection and hence there is greater freedom to select a way which other criteria (such as consideration of replacement policy information) indicates is the preferred way to select as the replacement way.

The allocation control circuitry may maintain allocation tracking information indicating, separately for the respective sets of the set-associative cache, how many ways of that set have been allocated for information associated with a given partition identifier. This can be useful for deciding, when allocating new information into the cache, whether it is possible to assign an additional way to the partition identifier of the cache access request being processed. By tracking the allocation tracking information separately for respective sets of the set-associative cache (instead of, or in addition to, providing a count of the total number of entries of the cache as a whole that have been allocated for information associated with a given partition identifier) this enables the cache maximum associativity value to be used to enforce a separate allocation limit for each set to make it less likely that a given software execution environment is not able to have its information allocated into a particular set.

In one example, when the new information is to be allocated to the target set in response to the cache access request specifying the selected partition identifier and the allocation tracking information indicates that the number of ways of the target set allocated for information associated with the selected partition identifier has already reached the maximum number determined based on the selected cache maximum associativity value, the allocation control circuitry selects, as the replacement way, a way of the target set which is indicated by the allocation tracking information as already having been allocated for information associated with the selected partition identifier. This can prevent software associated with the selected partition identifier from gaining more ways in the target set than the maximum number determined based on the selected cache maximum associativity value.

Conversely, when the new information is to be allocated to the target set but the allocation tracking information indicates that the number of ways allocated for information associated with the selected partition identifier has not yet reached the maximum number, then the allocation control circuitry may select, as the replacement way, either a way already allocated for information associated with the selected partition identifier or a way which was previously allocated for information associated with another partition identifier or which is currently invalid.

There may be various ways of implementing the allocation tracking information and in general any information which enables the number of ways in a given set currently allocated to a particular partition identifier to be identified may be used. For example, some implementations could implement the allocation tracking information as a set of counter values where each counter corresponds to one set and indicates the number of ways allocated for a corresponding partition identifier, and there being separate counters corresponding to the same set for different partition identifiers. In that case, if the maximum number of ways allocated for a given partition identifier has already been reached then subsequent attempts to allocate into the cache for that partition identifier could be rejected.

However, for some replacement selection schemes it may be useful to be able to determine which particular entries have been allocated to a given partition identifier within a given set. Hence, in some examples, the allocation tracking information may comprise a number of allocation tracking entries which correspond to respective combinations of partition identifier, set and way, where a given allocation tracking entry Ue[p][s][w] indicates whether way w of set s of the set-associative cache is allocated for information associated with partition identifier p. With this approach, when allocating new information into the cache, the allocation tracking entries corresponding to the selected partition identifier and the respective ways within the target set can be used to determine which entries are allowed to be allocated with the information requested by the corresponding cache access request, depending on whether the currently allocated entries for that partition identifier has reached the maximum number. If the maximum number of ways allocated for that partition identifier has already been reached, the replacement way may be selected to be one of the ways which are indicated by the allocation tracking entries for the corresponding set and selected partition identifier as already being allocated for information associated with the selected partition identifier. In some examples, in addition to this form of allocation tracking information (which could be a bitmap where each allocation tracking entry corresponds to a single bit flag for example), a separate set of counters could also be maintained to simplify checking of how many entries within a given set have been allocated to a particular partition identifier. Alternatively, such count values could be determined on the fly by counting the number of allocation tracking entries within the vector of entries corresponding to the target set and selected partition identifier that are set to a value indicating that the selected partition identifier has allocated information to the corresponding way, so in that case a separate set of counters would not be needed. The particular format of the allocation tracking information can therefore vary from example to example.

When the allocation tracking information comprising the allocation tracking entries mentioned previously is used, then when information is invalidated, evicted or replaced in a given way of a given set of the set-associative cache, the corresponding allocation tracking entry may be updated to indicate that the given way of the given set no longer stores information associated with a particular partition identifier. In some examples, this could be done simply by clearing the allocation tracking entries corresponding to the invalidated, evicted or replaced way/set that are associated with all of the possible partition identifier values, but in systems which support a relatively large number of partition identifiers this may require maintenance of a relatively large number of allocation tracking entries, which can be costly in terms of power consumption.

Therefore, in some examples a partition identifier structure may be maintained which includes a number of partition identifier entries corresponding to respective combinations of set and way, where a given partition identifier entry PUe[s][w] corresponding to a certain way w of a certain set s of the set-associative cache indicates the partition identifier associated with information allocated to way w of set s. In response to invalidation, eviction or replacement of information in way wA of set sB of the set-associative cache, the allocation control circuitry may read a partition identifier pC from the partition identifier entry PUe[sB][wA] corresponding to way wA and set sB, and clear the allocation tracking entry Ue[pC][sB][wA] corresponding to partition identifier pC, set sB and way wA to indicate that information associated with partition identifier pC is no longer allocated to way wA in set sB. This approach reduces the number of allocation tracking entries that need to be updated in response to an invalidation, eviction or replacement.

In practice, the partition identifier entries can be useful, not only for maintenance of the allocation tracking entries, but also for other purposes. For example, when a way of the set associative cache is evicted or replaced and information is to be written back to a further level of cache or to main memory, it may be useful to tag the writeback request with the same partition identifier that was associated with the cache access request which originally caused the information to be allocated to the evicted entry, which can allow the further level cache or the memory downstream of the set associative cache to also implement resource partitioning based on the tagged partition identifier. Hence, in some cases the partition identifier structure may already be provided to track the partition identifiers to use for writeback requests, and so it may not incur much additional overhead to also use the partition identifiers in the partition identifier structure to control maintenance of the allocation tracking entries when a way of the cache is invalidated, evicted or replaced. In some cases, the partition identifier structure could be a dedicated structure separate from the cache storage itself. In other cases, the partition identifier structure could be a portion of a cache tag structure storing cache tag information for ways and sets of the set-associative cache, where the tag structure may also be used to provide other types of tag information such as the address tag identifying a part of the address associated with the information in the corresponding way in the set. Hence, it is not essential to provide a dedicated partition identifier structure, as in some cases this may be combined with the tag storage of the cache.

The selected cache maximum associativity value may be one of a number of alternative cache maximum associativity values available for selection by the selecting circuitry of the set-associative cache, corresponding to different partition identifiers. For example, the set-associative cache may have access to a settings table which may provide entries identifying resource control parameters corresponding to respective partition identifiers, and selection from the settings table may be based on the selected partition identifier assigned to a given cache access request. This enables different software processes which have been controlled to tag their cache accesses with different programmable partition identifiers to see different effective views of the amount of resource available in the cache, depending on the cache maximum associativity value. The cache maximum associativity value may not be the only form of resource allocation control implemented, and in some cases the settings could also support other types of resource control settings.

The selected cache maximum associativity value may be programmable by software processed by the processing circuitry. This could be achieved in different ways. For example the selected cache maximum associativity value could be part of a memory-based settings data structure which can be written to by issuing memory access requests from the processing circuitry specifying addresses within that data structure. The cache could read the settings from that memory-based data structure, including reading of the select cache maximum associativity value, by issuing access requests to memory. The set-associative cache may itself have some internal settings caching registers which may cache a portion of the memory-based settings data structure for faster access.

Alternatively, instead of storing the settings data structure in memory, the structure could be resident within internal registers of the set-associative cache which are provided for storing settings information, including the cache maximum associativity value. These registers could be programmed by software operating in the processing circuitry, for example because the registers used to store the cache maximum associativity value may be memory-mapped registers which are mapped to certain memory addresses within an address space and so can be accessed using memory access instructions, or alternatively the registers storing the settings information themselves may not be directly memory-mapped but there may be some interface registers which are memory-mapped and can be used to select which entries of a settings table are to be updated in response to a certain memory access request targeting a certain memory-mapped address. Another approach could be that the registers of the cache used to store the selected cache maximum associativity value and other resource control settings could be directly exposed to software using some dedicated signalling mechanism or a dedicated type of setting instruction.

Hence, there are a wide variety of techniques by which the cache maximum associativity value can be programmable, so that resource allocation controlling software executing on the processing circuitry may select the effective amount of associativity of the set-associative cache available for use by a certain piece of software associated with a given partition identifier.

Hence, both the at least one partition identifier selection value which controls which partition identifier is specified for the cache access request, and the selected cache maximum associativity value which is used to define the maximum number of ways allocatable to that partition, may be programmable by software. In some cases the ability to program these values may be restricted to certain more privileged software and software with lower privilege may not be allowed to program the at least one partition identifier selection value and/or the selected cache maximum associativity value.

In some examples, the cache maximum associativity value could be represented as an absolute number of ways, which can be used to identify the maximum number of ways allowed to be allocated. However, this approach may make it harder for software to program the cache maximum associativity value since the software may need to consider the particular micro-architecture of a given cache, recognising that some caches may have a greater number of ways than others and so to achieve a similar restriction of the relative amount of cache capacity allocatable for a given partition identifier, caches with different associativity may require different values of the maximum number of ways.

Hence, in some examples it can be useful for the cache maximum associativity value to be programmable by software using a value having an encoding which identifies a fraction between 0 and 1 so that the fraction may then be combined with the total number of ways in the set of the set associative cache to identify the maximum number of ways. For example, if each set of the set-associative cache has W ways, the selected cache maximum associativity value associated with the selected partition identifier p can be programmed by software specifying a fraction F[p] where $0 \le F[p] \le 1$, and the allocation control circuitry may determine the maximum number of ways based on W*F[p]. With this approach, software development is simpler because the software can be platform-independent as it does not need to take account of the particular associativity W of a given cache on a given processor implementation when programming the cache maximum associativity value.

In an example where the cache maximum associativity value is programmed by software specifying a fraction, the number of bits specified for the fraction by the software programming the cache maximum associativity value may not be the same as the number of bits provided in hardware to store the stored cache maximum associativity value used by the allocation control circuitry to control allocation to the cache. For example, an architecture supported by the apparatus may specify that the cache maximum associativity value has a precision corresponding to a defined maximum number of bits, but it may not be essential for the internal representation of the cache maximum associativity value used by the hardware implementation to support the full number of bits defined in the architecture. For example a hardware implementation might select the number of implemented bits for the encoding of the cache maximum associativity value based on the number of ways provided in the cache, to avoid expending more bits than necessary to represent each possible threshold of limiting allocation of cache ways up to the maximum number of cache ways. For a cache with 16 ways, say, each possible allocation of ways from 0 to 16 would require 17 settings in total and so could be implemented using a 5-bit value (or, if it is considered acceptable not to be able to represent one of those 17 settings, a 4-bit value). Therefore, if the number of bits allocated for the cache maximum associativity value in hardware is less than the number of bits used in software, then on programming the value stored in hardware based on a request for software, the hardware may map the value specified by software to the value stored in hardware, for example by truncating bits that are less significant than the least significant bit stored in hardware, or by some other method of mapping the value specified in software to a value representable in hardware (e.g. rounding the software-specified value to the nearest value representable in hardware, or using a bias to bias towards upper or lower values representable as desired). In some examples, the rounding/bias method used may vary for different portions of the scale of fractions represented by the encoding specified by the software—e.g. for larger fractions the software-specified value could be rounded up towards the next highest value representable by the hardware, while for smaller fractions the software-specified value could be rounded down towards 0, to ensure that both 0% and 100% of the cache associativity are able to be represented exactly in the stored representation of the cache maximum associativity value. It will be appreciated that the particular mapping used between the software-specified fractional value and the value of the cache maximum associativity value used by hardware to control cache allocation can vary from one implementation to another.

In one example, for at least a subset of sets of the set-associative cache, the allocation control circuitry may determine the maximum number of ways as corresponding to W*F[p], rounded to an integer. If rounding is needed, the rounding can be either based on rounding to the next highest integer or rounding to the next lowest integer (and as mentioned above, different implementations could use different rounding methods for different portions of the range of fractions F[p]).

In some examples the maximum number of ways allocatable for a particular partition identifier p may be the same for all sets. This can simplify the hardware implementation. In some implementations, the number of bits supported for F[p] in an internal hardware representation may be such that each possible value of W*F[p] maps to an integer number of ways, so that it is not necessary to consider fractional values of W*F[p].

However, this approach is not essential and some implementations may allow the maximum number of ways to be different for different sets of the set-associative cache, even when considering the same value of the selected cache maximum associativity value.

For example, this could be useful when the product of the total number of ways per set, W, and the fraction F[p] indicated by software as the selected cache maximum associativity value does not correspond to an exact integer. In that case, if all sets are allocated the same number of ways then this may mean that the maximum fraction of total entries in the cache that can be allocated for partition identifier p may be different to E*F[p], where E is the total number of entries across all sets of the set-associative cache. This may not be a problem and in some implementations it may be considered acceptable for the effective fraction of total cache capacity usable by software associated with a given partition identifier to sometimes be lower or higher than the fraction indicated by software for the cache maximum associativity value. For simplifying the hardware implementation, some implementations may prefer to treat all the sets the same and simply restrict the number of ways that can be allocated for a given partition identifier in a given set to W*F[p], rounded to an integer.

However, in other implementations, to allow the fraction of total entries allocatable to a given partition identifier to more closely approximate the fraction F[p], which can help avoid sacrificing performance merely as an artefact of integer rounding, different sets of the set-associative cache may be allowed to allocate different maximum number of ways for partition identifier p.

For example, the sets of the set-associative cache may be treated as a first subset of sets and a second subset of sets, where the first subset of sets is limited to allocating, for information associated with a given partition identifier p, a maximum number of ways corresponding to Nw[p], where Nw[p] corresponds to an integer portion of W*F[p], rounded towards 0. However, for the second subset of sets of the set-associative cache, the maximum number of ways may be determined as Nw[p]+1. This ability to allocate one additional way in some of the sets of the set-associative cache can help to bring the overall fraction of entries allocatable for that partition identifier closer to the fraction F[p].

More particularly, when the number of sets in the set-associative cache is S, the allocation control circuitry can restrict the second subset of sets to comprise a maximum of Ns[p] sets of the set-associative cache, where Ns[p] corresponds to an integer portion of S*frac(W*F[p]), rounded towards 0, and frac(W*F[p]) is a fractional portion of W*F[p]. This approach helps the overall fraction of entries in the cache allocatable for partition identifier p to more closely approximate F[p]. This does not mean that at all times the corresponding partition identifier p need have allocated the additional way of each of those second subset of sets, as sometimes the requests for that partition may not have been enough to fully occupy all of the ways which could be allocated to that partition.

In some approaches the membership of the first subset and second subset of sets may be fixed so that certain sets can only be considered part of the first subset and other sets can only be considered as the second subset.

However, in some examples membership of the first and second subsets may vary depending on previous allocations. For example, sets could be allocated to the second subset based on need, with the first Ns[p] sets of the set-associative cache for which partition identifier p requires more than Nw[p] ways being allocated to the second subset, at which point further sets may no longer be allocated to the second subset until one of the previously indicated sets in the second subset has relinquished some ways.

Hence, in some examples the allocation control circuitry may maintain set tracking information which is indicative of which of the sets of the set-associative cache are in the second subset of sets, to allow the membership of the second subset to vary. The set tracking information may indicate which sets are in the second subset of sets separately for a number of different partition identifiers. Hence, a given set of the set-associative cache could be in the first subset for the purposes of allocating information associated with a first partition identifier but could be in the second subset when allocating information for a second different partition identifier.

In some examples, the allocation control circuitry may select the replacement way based on replacement policy information other than the selected cache maximum associativity value. For example any known replacement policy could be used, such as round robin, least recently used (LRU), re-reference interval prediction (RRIP) replacement policy or dynamic RRIP (DRRIP) policy, or any other replacement policy scheme known in the art. In general, such replacement policies may maintain some replacement policy information which indicates information for determining a preferred order of selecting particular ways as the way to be replaced if new information needs to be allocated in a particular set. Such replacement policies may aim to increase the likelihood that on accessing a cache for information associated with a particular address, the information associated with that address can be found in the cache. The replacement policy information is updated in response to observed cache accesses to try to predict which addresses may be most likely to be needed in future. An advantage of the cache maximum associativity value, in comparison to the cache portion bitmap control described earlier, is that the cache maximum associativity value imposes less restriction on the allowed ways to be selected in the replacement decision so that it impinges less on the running of the replacement policy, and hence allows the replacement policy to more efficiently select the ways to be replaced so as to maintain cache hit rates. This is because the cache maximum associativity value merely identifies an upper threshold to the number of ways which can be allocated for a given partition identifier within the same set, but does not specify specific ways which are excluded from being allocated to that partition identifier.

Nevertheless, optionally replacement way selection could still depend in some indirect way on the selected cache maximum associativity value, when at least one way has already been allocated for information associated with the selected partition identifier. For example, a comparison between the maximum number of ways determined from the selected cache maximum associativity value and the currently allocated number of ways may influence whether the replacement way may be selected from among ways not already allocated for information associated with the selected partition identifier or from among ways already allocated for information associated with the selected partition identifier. In some cases this relative comparison between the allowed maximum number of ways and the currently allocated number of ways for a given partition identifier may be used to form a mask (for example using the allocation tracking information described above which indicates which ways within a given set are allocated for information associated in a particular partition identifier), which could be used to adjust the ways allowed to be selected in the replacement policy and then among the ways that are allowed to be selected as indicated by the mask the replacement policy information can then be used to select between those ways.

Hence, when allocation of an additional way in the target set for information associated with the selected partition identifier would be possible without causing the number of ways in the target set allocated for information associated with the selected partition identifier to exceed the maximum number of ways determined based on the selected cache maximum associativity value, the allocation control circuitry may use the replacement policy information to select the replacement way from among ways of the target set not already allocated for information associated with the selected partition identifier; and when allocation of an additional way in the target set for information associated with the selected partition identifier would cause the number of ways in the target set allocated for information associated with the selected partition identifier to exceed the maximum number of ways determined based on the selected cache maximum associativity value, the allocation control circuitry may use the replacement policy information to select the replacement way from among ways of the target set already allocated for information associated with the selected partition identifier.

The cache maximum associativity value described above is described as being used when controlling way allocation for a set-associative cache. However, the processing apparatus could also include at least one fully-associative cache and the same format of selected cache maximum associativity value may also be used in conjunction with the fully-associative cache. However, for the fully-associative cache the associativity set of entries which are allowed to be allocated with information for a particular address may include all of the entries of the fully-associative cache, rather than a restricted subset of entries as in a set-associative cache. Hence, for a fully-associative cache, the selected cache maximum associativity value may be used to obtain a threshold on the total cache allocation permitted across all the entries of the fully-associative cache for the selected partition identifier, rather than imposing a limit separately on each individual set as in the case of the set-associative cache. The fully-associative cache may comprise selecting circuitry responsive to the cache access request specifying the selected partition identifier to select, based on the selected partition identifier, the selected cache maximum associativity value associated with the selected partition identifier; and allocation control circuitry to limit a total number of entries of the fully-associative cache allocated for information associated with the selected partition identifier to a maximum number of entries determined based on the selected cache maximum associativity value.

Therefore, by being able to use the same cache maximum associativity value to constrain either total cache allocation in the fully-associative cache or set-specific allocation within an individual set in the set-associative cache, the software developer developing the software which programs the selected cache maximum associativity value does not need to consider the cache organisation scheme used for a particular cache, as the software developer may be oblivious to the fact of whether a particular cache is fully-associative or set-associative, but can simply set the cache maximum associativity value in the same way regardless of which type of cache is provided. Nevertheless, in cases when that cache maximum associativity value is used to control allocation in a set-associative cache, this results in the number of ways allocated within the same set being limited to a maximum number as described above with that limit being imposed separately on each set, which in that case differs from a total cache allocation threshold as in the alternative approach mentioned earlier, to provide stronger guarantees that a "noisy" software execution environment cannot monopolise all of the locations within the cache to which information for a particular address can be allocated by a "quieter" software execution environment.

When a cache access request is received by the set-associative cache (or indeed the fully-associative cache mentioned earlier), a functional result of processing the cache access request may be independent of the selected partition identifier specified by the cache access request. Hence, the selected partition identifier may be information for controlling resource allocation, which may influence the level of performance achieved for certain requests. However, a functional result of processing the cache access request may be independent of the selected partition identifier. This may mean that which cache entry is accessed corresponding to a specified target address does not depend on the selected partition identifier. Also, the underlying memory location in main memory that corresponds to the information sought to be accessed in the cache access request may be independent of the selected partition identifier. Also, whether or not the cache access request is permitted or rejected (e.g. checking of access permissions in page tables) does not depend on the partition identifier. Also, whether the cache access request hits or misses in the cache may be independent of the selected partition identifier (while partition identifiers associated with each cache entry may be tracked for the purpose of managing whether additional entries can be allocated to the corresponding partition or for controlling assigning a partition identifier to a write back request on an eviction from the cache, such tracked partition identifiers are not used in a cache lookup to decide whether there is a hit or a miss in the cache). A request tagged with one partition identifier can hit against cache entries allocated by software associated with a different partition identifier.

The partition identifier is described above as being used by a cache to control resource allocation (e.g. replacement way selection). However, the same partition identifier could also be used by other memory system components, such as an interconnect or memory controller, to control other aspects of resource partitioning or contention management, such as allocation of bandwidth on a bus or interconnect or prioritisation between different requests. Hence, it will be appreciated that caches are not the only form of memory system component that may use the partition identifier.

General Architecture for Memory Resource and Performance Monitoring Partitioning FIG. 1 schematically illustrates an example of a data processing system 2 comprising N processing clusters 4 (N is 1 or more), where each processing cluster includes one or more processing units 6 such as a CPU (central processing unit) or GPU (graphics processing unit). Each processing unit 6 may have at least one cache, e.g. a level 1 data cache 8, level 1 instruction cache 10 and shared level 2 cache 12. It will be appreciated that this is just one example of a possible cache hierarchy and other cache arrangements could be used. The processing units 6 within the same cluster are coupled by a cluster interconnect 14. The cluster interconnect may have a cluster cache 16 for caching data accessible to any of the processing units.

A system on chip (SoC) interconnect 18 couples the N clusters and any other master devices 22 (such as display controllers or direct memory access (DMA) controllers). The SoC interconnect may have a system cache 20 for caching data accessible to any of the masters connected to it. The SoC interconnect 18 controls coherency between the respective caches 8, 10, 12, 16, 20 according to any known coherency protocol. The SoC interconnect is also coupled to one or more memory controllers 24, each for controlling access to a corresponding memory 25, such as DRAM or SRAM. The SoC interconnect 18 may also direct transactions to other slave devices, such as a crypto unit for providing encryption/decryption functionality.

Hence, the data processing system 2 comprises a memory system for storing data and providing access to the data in response to transactions issued by the processing units 6 and other master devices 22. The caches 8, 10, 12, 16, 20, the interconnects 14, 18, memory controllers 24 and memory devices 25 can each be regarded as a component of the memory system. Other examples of memory system components may include memory management units or translation lookaside buffers (either within the processing units 6 themselves or further down within the system interconnect 18 or another part of the memory system), which are used for translating memory addresses used to access memory, and so can also be regarded as part of the memory system. In general, a memory system component may comprise any component of a data processing system used for servicing memory transactions for accessing memory data or controlling the processing of those memory transactions.

The memory system may have various resources available for handling memory transactions. For example, the caches 8, 10, 12, 16, 20 have storage capacity available for caching data required by a given software execution environment executing on one of the processors 6, to provide quicker access to data or instructions than if they had to be fetched from main memory 25. Similarly, MMUs/TLBs may have capacity available for caching address translation data. Also, the interconnects 14, 18, the memory controller 24 and the memory devices 25 may each have a certain amount of bandwidth available for handling memory transactions.

When multiple software execution environments executing on the processing elements 6 share access to the memory system, it can be desirable to prevent one software execution environment using more than its fair share of resource, to prevent other execution environments perceiving a loss of performance. This can be particularly important for data center (server) applications where there is an increasing demand to reduce capital expenditure by increasing the number of independent software processes which interact with a given amount of memory capacity, to increase utilization of the data center servers. Nevertheless, there will still be a demand to meet web application tail latency objectives and so it is undesirable if one process running on the server can monopolise memory system resources to an extent that other processes suffer. Similarly, for networking applications, it is increasingly common to combine multiple functions onto a single SoC which previously would have been on separate SoCs. This again leads to a desire to limit performance interactions between software execution environments, and to monitor how those need to allow those independent processes to access the shared memory while limiting performance interactions.

Figure 2:
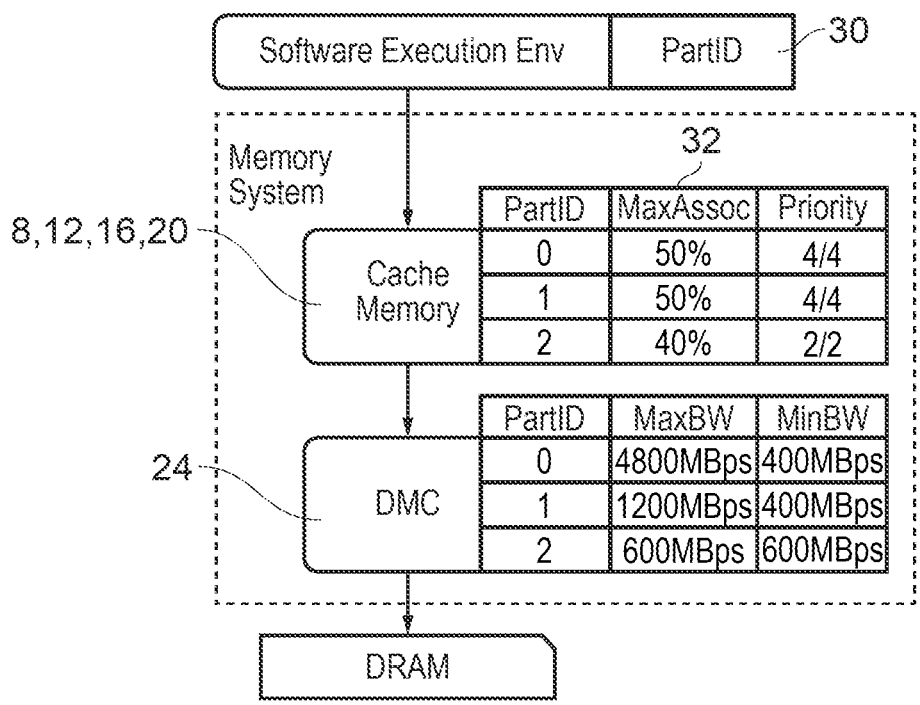
FIG. 2 schematically illustrates an example of partitioning memory system resource based on a partition identifier allocated to a software execution environment associated with a memory transaction.

FIG. 2 schematically illustrates an example of partitioning the control of allocation of memory system resources in dependence on the software execution environment which issues the corresponding memory transactions. In this context, a software execution environment may be any process, or part of a process, executed by a processing unit within a data processing system. For example, a software execution environment may comprise an application, a guest operating system or virtual machine, a host operating system or hypervisor, a security monitor program for managing different security states of the system, or a sub-portion of any of these types of processes (e.g. a single virtual machine may have different parts considered as separate software execution environments). As shown in FIG. 2, each software execution environment may be allocated a given partition identifier 30 which is passed to the memory system components along with memory transactions that are associated with that software execution environment.

Within the memory system component, resource allocation or contention resolution operations can be controlled based on one of a number of sets of memory system component parameters selected based on the partition identifier. For example, as shown in FIG. 2, each software execution environment may be assigned one or more partition identifiers, and each partition identifier may be assigned a cache maximum associativity value 32 representing a maximum amount of cache associativity that can be allocated for data/instructions associated with that partition identifier, with the relevant allocation threshold when servicing a given transaction being selected based on the partition identifier associated with the transaction. For example, in FIG. 2 transactions associated with partition identifier 0 may allocate information to up to 50% of the ways within any given set, leaving at least 50% of each set available for other purposes. Use of the cache maximum associativity value 32 is described further below. Other types of cache resource allocation controls may also be provided, such as a limit on the total number of entries allocatable for a given partition identifier, or a bitmap constraining which particular portions of a cache are allowed to be allocated for a given partition identifier.

Similarly, in a memory system component such as the memory controller 24 which has a finite amount of bandwidth available for servicing memory transactions, minimum and/or maximum bandwidth thresholds may be specified for each partition identifier. A memory transaction associated with a given partition identifier can be prioritised if, within a given period of time, memory transactions specifying that partition identifier have used less than the minimum amount of bandwidth, while a reduced priority can be used for a memory transaction if the maximum bandwidth has already been used or exceeded for transactions specifying the same partition identifier.

It will be appreciated that these are just two examples of ways in which control of memory system resources can be partitioned based on the software execution environment that issued the corresponding transactions. In general, by allowing different processes to "see" different partitioned portions of the resources provided by the memory system, this allows performance interactions between the processes to be limited to help address the problems discussed above.

Similarly, the partition identifier associated with memory transactions can be used to partition performance monitoring within the memory system, so that separate sets of performance monitoring data can be tracked for each partition identifier, to allow information specific to a given software execution environment (or group of software execution environments) to be identified so that the source of potential performance interactions can be identified more easily than if performance monitoring data was recorded across all software execution environments as a whole. This can also help diagnose potential performance interaction effects and help with identification of possible solutions.

An architecture is discussed below for controlling the setting of partition identifiers, labelling of memory transactions based on the partition identifier set for a corresponding software execution environment, routing the partition identifiers through the memory system, and providing partition-based controls at a memory system component in the memory system. This architecture is scalable to a wide range of uses for the partition identifiers. The use of the partition identifiers is intended to layer over the existing architectural semantics of the memory system without changing them, and so addressing, coherence and any required ordering of memory transactions imposed by the particular memory protocol being used by the memory system would not be affected by the resource/performance monitoring partitioning. When controlling resource allocation using the partition identifiers, while this may affect the performance achieved when servicing memory transactions for a given software execution environment, it does not affect the result of an architecturally valid computation. That is, the partition identifier does not change the functional outcome or result of the memory transaction (e.g. what data is accessed), but merely affects the timing or performance achieved for that memory transaction.

Processing Element Supporting Partition Identifier Selection

Figure 3:
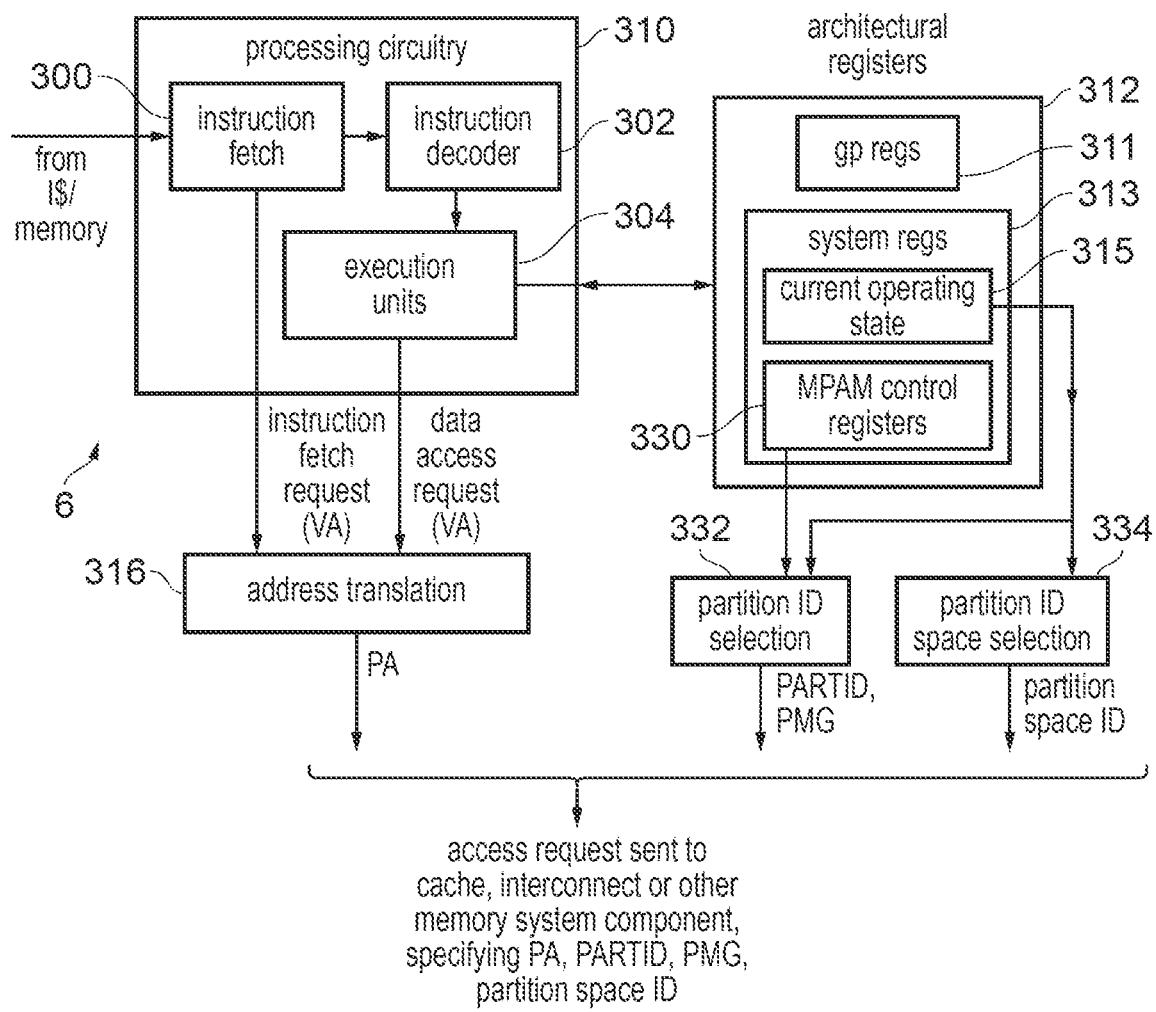
FIG. 3 shows an example of processing circuitry issuing access requests to the memory system which specify a partition identifier selected based on programmable information within at least one architectural register.

FIG. 3 shows in more detail some components within a given processing element 6 of the system 2 shown in FIG. 1, for example the processing element may be one of the CPUs 6 shown in FIG. 1. The processing element includes processing circuitry 310 capable of executing instructions according to an instruction set architecture. The processing circuitry 310 includes instruction fetch circuitry 300 for fetching instructions from an instruction cache or from memory, an instruction decoder 302 for decoding the fetched instructions, and one or more execution units 304 for executing processing operations in response to the instructions decoded by the instruction decoder 302. Registers 312 are provided for storing operands for instructions executed by the processing circuitry 310, results of executed instructions control data for configuring how processing is performed by the processing circuitry 310. The registers 312 may include general purpose registers 311 used for storing results of executed instructions or for storing operands for processing by instructions executed by execution units 304. The registers 312 may also include system registers 313 which may store control state information used for controlling the operation of the processing element 6. The registers 312 are architectural registers, which may be implemented as defined by an instruction set architecture supported by the processing element 6. Hence, software executing on the processing circuitry 310 may expect a certain set of registers to be exposed to the software as defined in the instruction set architecture. The format of the architectural registers and the mechanisms for interacting with state in those registers may be prescribed by the instruction set architecture.

The processing circuitry may support execution of the instructions in a number of different operating states. For example, the processing circuitry may support execution of instructions as a number of exception levels (privilege levels), which may be associated with different levels of privilege so that instructions executed at a more privileged exception level may have greater rights than instructions executed at a less privileged exception level. For example, instructions executed at a less privileged exception level may not be allowed to carry out some operations reserved for code operating at a more privileged exception level, or may not be able to access data in registers or memory which is accessible to code at a higher privileged exception level. Also, in some examples the processing circuitry may support processing instructions in a number of domains of operation (or security states), where each security state may be associated with an isolated physical address space. When the same address is accessed within the different physical address spaces associated with different security states, at least some components of the memory system may treat the same address from the different physical address spaces as corresponding to different memory system locations, even though ultimately that address may correspond to the same memory system location in main memory. In some examples there could be two domains (a secure state and a non-secure state) while other examples may support more than two domains. An example of a system supporting such partitioning of secure and non-secure domains is a system based on the TrustZone® architecture provided by Arm® Limited. Such partitioning of domains may provide greater security guarantees to ensure that more secure code is isolated from access by less secure code and the less secure code cannot gain visibility as to the operations of the more secure code since, for the purposes of accessing caches or other memory system components, addresses in the respective physical address spaces of the different domains may be treated as if they refer to different memory system locations.

The system registers 313 may include one or more registers which store state information 315 used to determine a current operating state of the processing circuitry. For example, the current operating state information 315 could include an indication of a current exception level. Also, the current operating state information 315 could include state used to determine which domain of operation is the current domain. While FIG. 3 shows the current operating state information 315 as a single control register, this is not essential and other architectures could determine the current operating state (e.g. domain) based on two or more items of control state which may be stored in different registers or in different parts of the same register rather than providing a single domain indication. For example, which domain is the current domain could be determined as a Boolean function of control bits accessible from different system registers.

The processing circuitry 310 may issue memory access requests specifying virtual addresses, which could be either instruction fetch requests issued by the instruction fetch stage 300 (or by a prefetcher in some examples) to fetch instructions from a cache or memory within the memory system, or a data access request issued by execution units 304 which could be a request to read data from the memory system or write data to the memory system. Address translation circuitry 316 (e.g. a memory management unit (MMU)) translates the virtual address into a physical address (PA) through one or more stages of address translation based on page table data defined in page table structures stored in the memory system. The address translation circuitry 316 could include a translation look aside buffer (TLB) which acts as a lookup cache for caching some of that page table information for faster access than if it had to be fetched from memory each time an address translation is required.

To support the partitioning of memory system resources and performance monitoring, the processing element 6 also includes partition identifier (ID) selection circuitry 332 for selecting a partition ID to specify for a memory access request sent to a cache, interconnect or other memory system component. The architectural registers 312 include, as system registers 313, a number of memory partitioning and monitoring (MPAM) control registers 330 which provide partition ID selection information which can be used by the partition ID selection circuitry 332 to select which partition identifier is to be specified for a given memory access request. The partition ID selection may also depend on the current operating state 315 of the processing element.

Optionally, the processing element may also include partition ID space selection circuitry 334 which may select one of a number of partition ID spaces and may output a partition ID space indicator. Each partition ID space could be associated with one of the security states or domains of the processing element so that software operating in different domains can define partition IDs with the same numeric value which can be distinguished by the corresponding partition ID space indicator. This makes software development for the different domains simpler because it avoids software in different domains needing to coordinate their selection of partition IDs to avoid using overlapping partition ID values. Again the selection of the partition ID space by circuitry 334 may depend on the current operating state 315, such as on the current operating domain. Partition ID space selection circuitry 334 is not essential since in systems which do not support different domains or security states there may be no need to support different partition ID spaces, and even in a system which does support multiple domains or security states, another approach can simply be to have those states sharing a common partition ID space (in that case there may need to be additional cooperation between the software developers writing code for those domains to avoid selecting the same partition ID value for software in the respective domains which should not share the same set of memory system component resource control settings).

The partition ID selected by circuitry 332 and the partition ID space indicator selected by circuitry 334 together represent information which can be appended to a memory access request sent to the cache, interconnect or other memory system component, and can be used by the memory system component to control resource allocation, contention for resources or to control performance monitoring.

Figure 4:
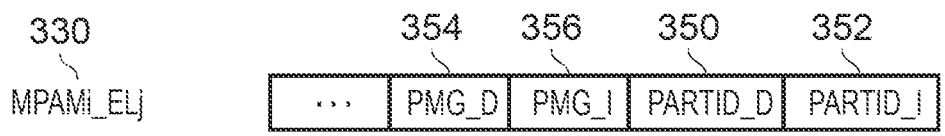
FIG. 4 shows an example of an architectural register providing at least one partition identifier selection value.

FIG. 4 shows an example of an MPAM control register 330 in more detail. The MPAM control registers 330 include a number of partition ID registers MPAMi_ELj where i indicates the exception level for which that register is used to control assignment of partition IDs and j indicates the least privileged exception level which is able to update the information in that register. Hence, MPAM0_EL1, for example, provides partition IDs for use at exception level EL0 and is updatable by code operating at exception level EL1 or higher. For example, in a system which supports execution at four different exception levels EL0, EL1, EL2, EL3, where EL3 has the greatest privilege and EL0 has the least privilege, the MPAM control registers 330 may include registers MPAM3_EL3, MPAM2_EL2, MPAM1_EL1 and MPAM0_EL1, for setting partition identifiers for use at exception levels EL3, EL2, EL1 and EL0 respectively. These registers include information for selecting the partition ID to be appended to a memory access request when sent to the memory system and (if multiple partition ID spaces are supported) for selecting the partition ID space to be indicated for the memory access request. The state in partition ID registers 330 can be regarded as part of the context information associated with a given software execution environment executing on the processing circuitry. When a context switch occurs, the registers 330 are updated with the context information associated with the incoming software execution environment, so that the incoming software execution environment can have its memory accesses tagged with a different partition ID to the outgoing software execution environment.

Each partition ID register 330 includes a number of partition ID fields 350, 352, 354, 356 for providing partition IDs to use for software executed at the corresponding exception level. In this example there are at least 4 fields including a data (resource partitioning) partition ID (PARTID_D) field 350, an instruction (resource partitioning) partition ID (PARTID_I) field 352, a data performance monitoring group ID (PMG_D) field 354 and an instruction performance monitoring group ID (PMG_I) field 356.

The fields 350, 354 are used for data memory accesses and the fields 352, 356 are used for instruction fetch memory accesses.

The fields 350, 352 provide a resource partitioning partition ID for use in data accesses and instruction fetches respectively. The memory system component can use the partition ID selected based on the value in one of the resource partitioning partition ID fields 350, 352 to control allocation of resources such as cache capacity or memory bus bandwidth or to manage contention between different requests (for example by selecting request priority based on the partition ID).

The performance monitoring group fields 354, 356 provide an ID that can be used by memory system components to control whether to update performance monitoring data based on the performance monitoring group ID. In some examples the performance monitoring group ID in fields 354, 356 can be regarded as a standalone ID, separate from the resource control partition ID fields 350, 352. However, in other examples the performance monitoring group ID 354, 356 may be some additional bits which can be used in conjunction with the resource control partition ID 350, 352, so that in that case whether the performance monitoring data is updated may depend on matching both the selected partition ID and the selected performance monitoring group ID, thereby subdividing a partition into subgroups by the performance monitoring group ID. For example, the PMG fields 354, 356 may be regarded as a subdivision or subgroup of the partition ID for performance monitoring purposes. Regardless of whether the PMG fields 354, 356 are interpreted independently of the PARTID values or are read in combination with the PARTID values, by defining a performance monitoring group ID 354, 356, this allows different subsets of requests which share the same resource partitioning partition ID to be distinguished for the purpose of performance monitoring.

It will be appreciated that it is not essential to provide separate partition IDs for resource partitioning (using fields 350, 352) and performance monitoring control (using fields 354, 356). In other examples the same ID could be used for both purposes, or some implementations may not support partitioning of performance monitoring control so could omit fields 354, 356.

Also, it is not essential for separate instruction and data partition IDs to be supported and other examples could provide a common ID for both purposes. However, It can be useful to allow separate partition IDs to be defined for the data and instruction accesses for the same software execution environment, so that different resource control parameters can be used for the corresponding instruction and data accesses. An alternative approach would be to have a single partition ID associated with a software execution environment as a whole, but to append an additional bit of 0 or 1 depending on whether the access is for instructions or data, and this would allow the memory system component to select different control parameters for the instruction and data accesses respectively. However, for a given number of sets of control parameters selected based on the partition ID, this approach would mean that there would have to be a 50-50 split of the partition ID space between data and instructions. In practice, it may often be desirable to have more data partitions than instruction partitions, because it can be relatively common for multiple software execution environments to use the same code but execute with different data inputs, and so it can be particularly useful to be able to share a single instruction partition ID among multiple software execution environments while allowing each of those environments to use different data partitions. The approach of appending a 0 or 1 bit to indicate instruction or data accesses would in that circumstance require multiple sets of identical configuration information to be defined at the memory system component for each separate instance of the common code. In contrast, by providing separate instruction and data partition fields in the partition ID register 330, where the instruction and data partition IDs are selected from a common ID space, it is possible to reuse the same partition ID between different software execution environments and to partition the partition ID space between data and instructions as required without constraining this to a fifty-fifty split. Even though some additional storage capacity may be required for twice as many partition ID fields in each partition ID register 330, this approach can save resource at the memory system component since by sharing one partition between the instruction accesses of multiple execution environments, fewer sets of control parameters (and hence less storage) are required at the memory system component.

In general, the current exception level of the processing circuitry 310 may determine which of the MPAM control registers 330 is used to provide the partition ID selection information. However, in some implementations it may be possible to define further control state information within control registers that may vary which partition ID register is selected for a particular exception level, departing from the default of using the register 330 that is associated with the current exception level. For example, it is possible to set a parameter which may force the partition IDs in register MPAM1_EL1 to be used when the current exception level is EL0, which could be useful in cases where an operating system wishes the applications it is managing to use the same partition ID as the operating system itself as defined in MPAM1_EL1, so that this can avoid the operating system having to set partition ID values for MPAM0_EL1 330, in some systems some additional control state (e.g. stored in the MPAM control registers 330 or other registers) may also influence the selection of the MPAM register, not just the current exception level, but this additional control is not essential.

In some examples the partition ID value selected based on MPAM control registers 330 may be directly assigned to the corresponding memory access so that the value of the partition ID seen by the memory system component may match the value read from MPAM control registers 330. However, some implementations could also implement virtualisation of partition IDs, so that a virtual partition ID read from MPAM control registers 330 could be remapped to a physical partition ID value to be specified in the corresponding memory access request. In systems supporting virtualisation of partition identifiers, whether virtualisation is currently enabled may depend on information specified in at least one system register 313. Virtualisation may not be needed for more privileged exception levels, but for the lower privileged exception levels (such as operating-system-level exception level EL1 or application-level exception levels EL0), there may be a desire to support virtualisation so that different guest operating systems which may have defined conflicting partition ID values can coexist on the same system without conflict, since their conflicting virtual partition ID values can be remapped to different physical partition ID values. This means the respective operating systems' access requests can be distinguished at a memory system component to perform separate resource allocation control or performance monitoring. The virtualisation could be based on remapping the virtual partition IDs to physical partition IDs based on mapping information set for the current execution environment. The mapping information may be defined in a mapping table which could be implemented in different ways. For example, the mapping table could be defined in a set of partition ID remapping registers defined in the architectural registers to specify the physical partition ID values corresponding to different values of virtual partition IDs read from MPAM control registers 330 (values in those registers may be switched in and out of those architectural registers on a context switch, to change the virtual-to-physical partition ID mappings used for different software execution environments). Alternatively, a remapping structure stored in memory could be used to provide the mapping table. Hence, it will be appreciated that fields 350-356 of MPAM control registers 330 may act as partition ID selection information used to control which partition ID value is appended to a memory access request, but as it is possible to support virtualisation, it is not essential for the value of the partition ID specified by the memory access request to equal the value of the corresponding partition ID field within register 330.

Hence, as shown in FIG. 3 a memory access request may be tagged with a partition ID (which could include PARTID and optionally the PMG) and a partition ID space indicator in examples which support multiple partition ID spaces. For conciseness, in the subsequent examples, to avoid explicitly calling out the partition ID space indicator each time this is referenced, references to partition ID may be considered to encompass the partition ID space indicator, since the partition ID and partition ID space indicator may collectively be considered information defining a particular "partition" of software executing on the processing circuitry where each partition is allocated a respective set of resource control settings for controlling memory system component resource allocation. Hence, while the partition ID space indicator is not explicitly mentioned in the remaining examples, it will be appreciated that the references to partition ID encompass the partition ID space indicator so that requests specifying the same PARTID or PMG value but different partition ID space indicators may be considered to correspond to different "partition identifiers" for the purposes of the subsequent examples.

Memory System Component Usage of Partition Identifier

The memory access request issued by the processing element 6 specifies a PA and a partition ID as mentioned above. This request may be sent to various components of the memory system, such as a cache, interconnect 14, 18 or memory controller 24. A memory system component which receives the partition ID may use that ID to select resource control settings which control how that component allocates resource for handling the request.

Figure 5:
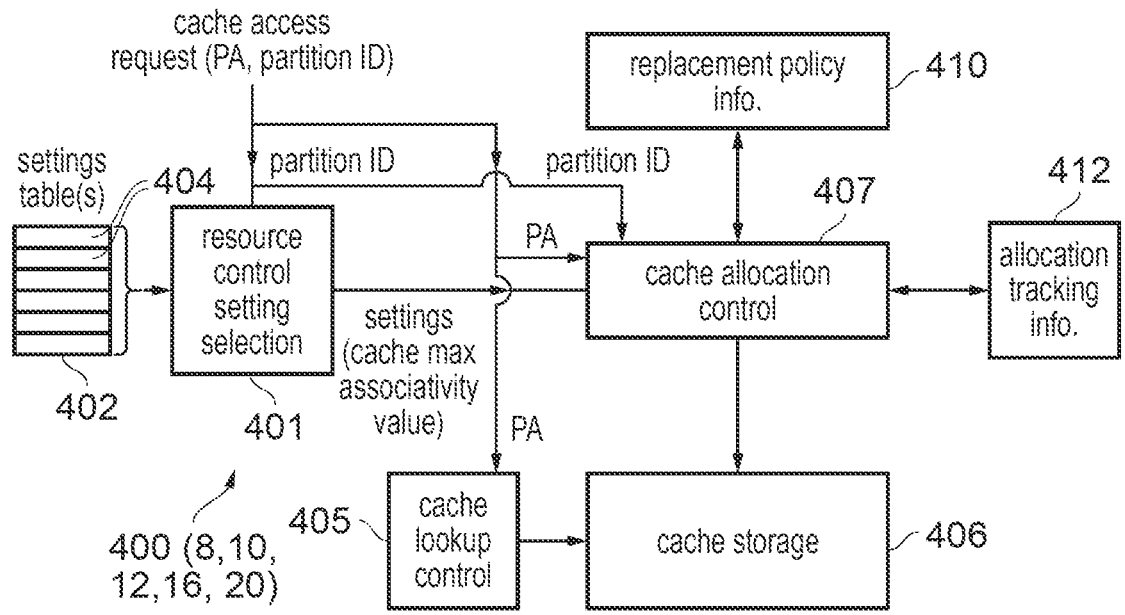
FIG. 5 shows an example of components of a cache.

FIG. 5 shows a specific example of a memory system component which is a cache 400, which could be one of the caches 8, 10, 12, 16, 20 as mentioned earlier. Hence, when a memory access request issued by processing element 6 is received by the cache 400 then the memory access request is treated as a cache access request, still specifying the PA and partition ID. FIG. 5 shows an example of components of a cache 400. The illustrated components are those for controlling resource allocation in the cache based on the partition ID (the cache 400 may also include other components). While not shown in FIG. 5, the cache may also support performance monitoring partitioning based on PMG, but for conciseness this is not shown.

The cache includes resource control setting selection circuitry 401 which selects a set of resource control settings from a resource control settings structure (settings table) 402, based on the partition ID specified in a received cache access request. The settings table 402 includes a number of entries 404 each corresponding to a different partition ID and defining resource control parameters for controlling cache allocation for requests specifying the corresponding partition ID (again, here "partition ID" may encompass the partition ID space indicator so that the settings table 402 may include separate entries 404 for the same PARTID value occurring in different partition ID spaces). For the resource allocation control, the relevant partition ID to use is based on the PARTID value determined based on fields 350, 352 of MPAM control registers 330 mentioned earlier, rather than the PMG values 354, 356.

The resource control settings structure 402 could be a set of registers implemented in hardware within the cache, which can be updated by the processing circuitry 310 issuing a memory access request specifying, as its target address, an address mapped to one of those registers (or an address mapped to an interface register used to trigger an update to the settings registers). Alternatively, the resource control settings structure 402 could a structure maintained within memory at a set of addresses allocated by software for that structure, and in that case the cache 400 could include a register identifying the base address of the memory based settings structure within the memory address space. Optionally, the cache could include some internal settings caching registers for caching a subset of resource control settings entries 404 from the memory-based structure.

The cache 400 has cache lookup control circuitry 405 for controlling lookup of cache storage circuitry 406 based on the physical address of a cache access request, and cache allocation control circuitry 407 for controlling allocation of new entries into the cache storage 406 when a cache lookup misses in the cache. While cache lookup control circuitry 405 and cache allocation control circuitry 407 are shown as separate circuit blocks in FIG. 5 these could also be combined into a single component.

The cache lookup control circuitry 405 looks up the cache storage 406 based on the physical address specified by the cache access request. The lookup may be independent of the partition ID, so that the particular partition ID specified for a cache access request does not affect whether the lookup identifies a cache hit or miss. A cache access request specifying one partition ID may hit against an entry allocated previously in response to a request specifying a different partition ID.

If a cache lookup misses in the cache for a given physical address then the cache allocation control circuitry 407 may control allocation of a new entry in the cache for information associated with the address which missed. The allocation is controlled based on the physical address and partition ID specified by the cache access request, the selected resource control settings selected by circuitry 401 from the settings structure 402 based on the partition ID, and replacement policy information 410 which may be used to influence which entry of a cache is selected as a replacement entry to be allocated with new information. The allocation control circuitry 407 may for example use a replacement policy such as RRIP, DRRIP or LRU to select the replacement entry. The allocation control circuitry 407 also maintains allocation tracking information 412, which may track which entries of the cache have been allocated for particular partition IDs, which can help with regulating the amount of cache capacity allocated to a given partition ID to be within limits defined in the selected resource control settings from table 402.

The cache may support a number of different types of resource control settings which may be used to control allocation of cache storage capacity for information (e.g. data or instructions) associated with the physical address PA of the request. For example, the resource control settings 404 may be used to control allocation of cache storage capacity for information associated with the physical address PA of the request. For example the resource control settings 404 could define a maximum cache capacity allowed to be allocated for data instructions associated with the specified partition ID and partition ID space, with the cache capacity restriction for example defining a maximum fraction of the cache capacity allowed to be used for that combination of partition ID and partition ID space indicator. Another option may be for the resource control settings to specify which individual portions of the cache (e.g. which ways of a set-associative cache) are allowed to be allocated for data or instructions associated with corresponding partition ID and partition ID space. With a portion-based control one software process could be restricted to using a relatively small subset of the ways of the cache while another software execution environment could be allowed to use a larger number of ways so that it is more likely that that other software execution environment sees greater performance when accessing memory. Either way, by providing some resource control settings which can limit the amount of cache capacity used by a given software execution environment, this can reduce the noisy neighbour problem by preventing one software execution environment using up the majority of the cache capacity.

However, in the examples discussed below a further type of resource control setting is described, which uses a cache maximum associativity value. The cache maximum associativity value may be supported alongside the maximum cache capacity and portion-based controls, and there may be information defined within a given settings entry 404 for a given partition ID indicating which type or types of control should be used for controlling allocation for requests specifying the corresponding partition ID. Hence it is not essential for all requests to have their cache allocation controlled based on the cache maximum associativity value, but the cache supports the option of using the cache maximum associativity value if the resource control settings have been set by software executing on the processing circuitry to indicate that the cache maximum associativity value should be used to control cache allocation for a given partition ID. In some examples, it may be possible for multiple types of resource allocation control settings to be used in combination, for example a cache maximum associativity value and a maximum capacity control could both be implemented simultaneously. The maximum cache capacity and portion-based controls will not be described in detail below and the remaining examples focus on use of the cache maximum associativity control.

Cache Maximum Associativity Control

Figure 6:
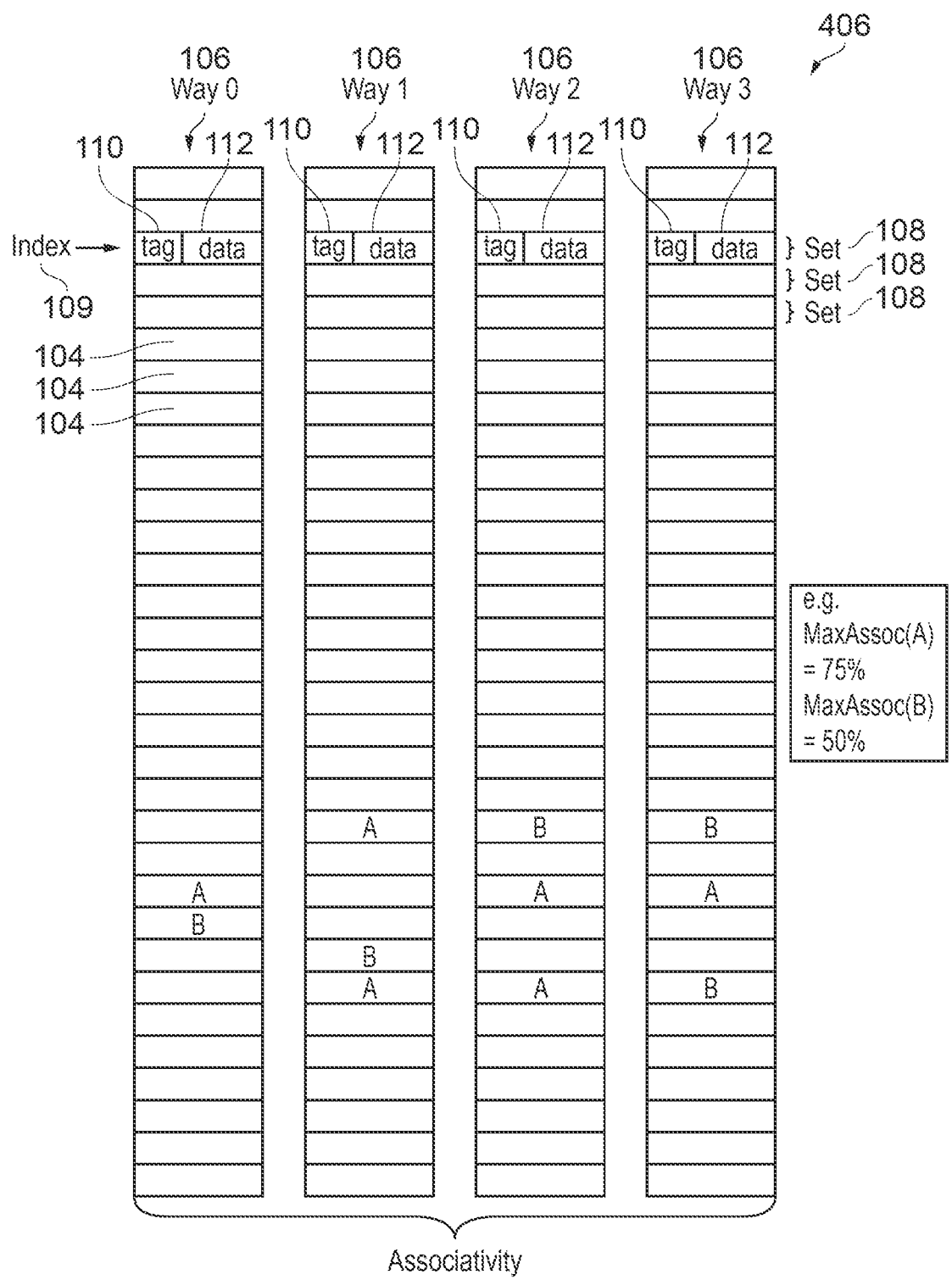
FIG. 6 shows an example of limiting allocation of ways in a set-associative cache based on a cache maximum associativity value.

It can be common for many of the caches used in processing systems to be implemented as a set-associative cache. As shown in FIG. 6, the cache storage 406 in a set-associative cache comprises a number of cache entries 104 logically divided into sets 108, each set 108 having two or more entries 104. For a cache having associativity A, this means that the number of entries in one set 108 is A. Such a cache can be described as an "A-way" set-associative cache and the entries can also be considered to be logically grouped into "ways" 106, where each set 108 comprises one entry 104 from each way 106. For example, a cache with four entries 104 per set is 4-way set-associative. The term "way" can also be used to refer to the respective entries 104 within the same set. It will be appreciated that FIG. 6 merely shows the logical arrangement of the entries 104, and the physical arrangement of the entries 104 may be different. For example, "neighbouring" entries of the same set 108 or the same way 104 may in practice be arranged at separate physical locations in the cache storage hardware.

The set-associative placement policy used for such a cache means that when data having a given address needs to be allocated into the cache, it is placed in one of the entries 104 within a particular set 108 that is selected based on an index value 109 computed based on the given address. In some cases the index value 109 may simply be a portion of bits extracted from the given address, while in other examples the index 109 could be based on a more complicated function of the given address (e.g. applying a hash function to the given address to obtain the index value 109). Hence, data associated with a given address cannot be stored in entries 104 of sets 108 other than the set corresponding to the index 109 selected based on the given address. This is useful because it reduces the number of entries of the cache which have to be checked to determine whether the cache stores data associated with a specified target address, but in comparison to a direct-mapped cache (where data for a given address can only be allocated to a single entry 104 selected based on the address), the set-associative placement scheme improves performance as there is flexibility to allocate data for a given address to two or more locations, which reduces the likelihood of thrashing as it means two or more different addresses mapping to the same set can each be cached simultaneously.

Each entry 104 may specify a cache tag value 110 and a data value 112. The data value 112 is the information of interest which is stored in the corresponding cache entry 104. The data value 112 could be data or instructions, or could be address mapping information cached in a translation lookaside buffer, for example. The tag 110 corresponds to a portion of the target address which is not used to generate the index, and is stored alongside the cached data 112 to allow the different addresses which map to the same index to be distinguished from each other when looking up in the cache. Each entry 104 may also store state information associated with the corresponding address, such as a valid indicator indicating whether the data in the corresponding entry 104 is valid, coherency state information (e.g. a dirty bit indicating whether the data value 112 has been modified compared to the corresponding data value in a higher level cache (e.g. L2 or L3 cache) or memory), or replacement policy information for selecting a victim cache entry when an entry needs to be evicted from the cache.

Hence, on a cache access to check whether information associated with a target address is stored in the cache, the index value 109 derived from the target address is used to select a set 108 and each of the tag values 110 in the entries 104 within the selected set 108 are compared with the tag portion of the target address. If any of the read tag values 110 match the tag portion of the target address then the corresponding cache entry 104 having the matching tag 100 stores the data for the requested target address, and that entry can be read or written depending on the type of access being performed. The scenario when one of the tags 100 in the indexed set 108 matches the tag of the target address is called a cache hit.

On the other hand, if none of the tags 110 in the indexed set 108 match the tag of the target address, then this is known as a cache miss, and in this case the information associated with the target address may need to be fetched from a further data store, such as a further level of cache or main memory. If one of the indexed set of caches is invalid, then the invalid entry can be selected for allocating the new data associated with a target address. However, if all of the indexed set of entries are already filled with valid data then one entry 104 of the indexed set 108 can be selected as a replacement entry for which the data 112 is to be evicted from the cache to make way for the new information associated with the target address.

It will be appreciated that not all caches within the data processing system may be set-associative caches and the system could also include some caches using a different organisation, such as fully-associative cache where data from a given address can be allocated to any entry of the cache. Control of allocation into a fully associative cache is described later with respect to FIG. 16. However, as the most common cache structure may be a set-associative cache providing resource partition controls suitable for management of allocation into a set associative cache can be desirable.

When considering a set-associative cache, one way of controlling cache allocation using the resource control settings selected based on the partition ID can be to provide a cache portion bitmap which specifies, for each partition ID, which ways 106 are allowed to be allocated for information associated with the corresponding partition ID. For example, one partition could be allowed to allocate only into ways 0, 1 and 2 but not into way 3, for example, while another way may be restricted to only allocating into ways 2 and 3. While this may help to avoid a single partition monopolising all the ways in a given set, the restriction on which ways are allowed to be allocated for a given partition may have an impact on performance. For example, the replacement policy information 410 may have been updated to track recent patterns of allocation and may indicate a prioritised order in which ways in a given set may be preferred for replacement to try to increase the probability that future accesses hit in the cache. If the resource control settings impose a hard partitioning of which ways can be allocated by a given partition, then this may mean that on particular replacement decision using a replacement policy, the preferred way indicated by the replacement policy information 410 as being most suitable for replacement may not be allowed to be allocated to the partition associated with the current access request and so this may result in a less preferred way being selected for replacement, causing other information which may have had a higher probability of being accessed again in future being evicted from the cache, and hence increasing the cache miss rate. Hence, if the cache bitmap portion control is used, this may have an effect of increasing cache miss rate on average and therefore decreasing system performance compared to a technique which does not constrain which specific ways are allowed to be allocated for information associated with a given partition ID.

On the other hand, a cache capacity maximum control may not constrain which specific ways are allowed to be allocated for information for a given partition, but may simply define a threshold indicating the maximum fraction of entries of the cache as a whole which are allowed to be allocated for a given partition. This avoids the hard way partitioning imposed by the cache bitmap and means that the replacement policy defined by the replacement policy information 410 can be followed more precisely. However, if the capacity threshold is imposed on the total number of entries 104 allocated to a given partition across all sets 108 (for example based on a single counter counting the total number of entries in the cache as a whole allocated to a given partition which can be compared against the threshold), then it is possible that even if a given partition has allocated fewer entries than the threshold, that partition could still have allocated entries in all of the ways 106 in the same set 108. In other words, the maximum capacity control may simply constrain total cache usage, but may leave the associativity usage within a given set unconstrained, which can lead to one partition using all of the associativity of some sets. This may prevent another partition which issues access requests less frequently from ever having entries in a particular set resident in the cache long enough to allow a subsequent access to the same address to hit in the cache, if the noisier partition which monopolises all the entries in that set is issuing requests more frequently and keeps evicting the quieter partition's data before the quieter partition can access the data again. Hence, in some scenarios the cache maximum control may still leave some pieces of software with insufficient cache capacity so that they do not see the benefit of the cache for some addresses.

As shown in the lower part of FIG. 6, the maximum associativity control can help to address this problem. The cache maximum associativity value defined in the resource control settings for a given partition gives control of the maximum associativity that a partition may use, that is independent of other resource controls on that cache. The maximum associativity control sets the maximum number of ways that a partition can use within any individual set 108 of the set-associative cache 406. This maximum applies to any associative grouping 108 within in the cache organisation. The same control may be shared with fully-associative caches, for which the associativity set is the entire cache capacity, in which case the cache maximum associativity control may function in the same way as the total cache capacity control for fully-associative caches. However, for set-associative caches these controls provide different effects.

For example, FIG. 6 shows an example where for a first partition A the maximum associativity value indicates a fraction of 75% of the associativity, and for a second partition B the maximum associativity is defined as 50%. In this example the cache is a 4-way set-associative cache and so the maximum associativity of 75% for partition A means that up to three ways within the same set may be allocated for information associated with partition A and so partition A is not allowed to allocated all four ways within any individual set. However, the associativity maximum does not impose any restriction on which particular way can be allocated and so, as shown in the example of FIG. 6, partition A may nevertheless (across the different sets of the cache as a whole) allocate some information into each of the ways 106, as long as the total number of ways allocated for partition A within any one set is not greater than three (corresponding to the 75% threshold). If the set-associative cache had a different associativity then the maximum number of ways would be different, but by defining the maximum associativity as a fraction this can allow the same control set by software to be used for different caches having different associativity without the software needing to take account of the particular associativity for a given cache. Similarly, for partition B the associativity maximum is 50% and so in this example this means that no more than two ways in a given set may be allocated for information associated with partition B as shown in FIG. 6.

Hence, regulation of cache associativity uses the partition's current occupancy of an associativity group to choose the allocation and replacement policies when an access by the partition attempts to allocate into the cache. If the current occupancy is below the threshold, the allocation is permitted and can replace any line. If the current occupancy is above the threshold, the allocation is not permitted unless the partition can replace a line that is currently allocated to that partition. Such a replacement keeps the current occupancy unaltered by the replacement.

The above algorithm can be amended to keep the new occupancy below the threshold by computing the new occupancy by adding the prospective allocation to the current occupancy and comparing that sum to the maximum associativity limit. If the post-allocation occupancy is below or equal to the limit, the allocation is permitted and can replace any line. If the post allocation occupancy is above the limit, the allocation is not permitted unless the partition can replace a line that is currently allocated to that partition.

Each partition ID can have a programmed cache maximum associativity parameter for a cache. The same parameter may be applied to all allocations by the partition in all associativity groups of the cache. The parameter may be represented in several ways:

The parameter could be the maximum number of entries from any associativity group that the partition may allocate, a non-negative integer.

The parameter could be a fixed-point binary fraction of the size of the associativity group.

The fixed-point binary fraction may be preferred embodiment because the same parameter can serve caches with different associativity and could serve both set-associative and fully-associative caches. As shown in more detail below, if the product of the fraction and the ways in a set is not an integer, in some implementations, the fractional part of the product may be used to determine a fraction of sets that can be allocated 1 more way than the integer part of the product. The fraction of sets allocated more than the exact product and those allocated less are regulated across all sets. Other implementations may not need to consider fractional parts of the product, e.g. if the internal representation used by hardware for the cache maximum associativity value has sufficiently few bits that the product of the fraction and the number of ways in a set is always an integer (in that case, if the software specifies binary fractions with a greater number of bits than can be represented in hardware, then on programming the cache maximum associativity value the software-specified value is mapped to a value representable by the hardware stored version of the cache maximum associativity value, e.g. by truncating least significant bits or biasing the cache maximum associativity value to the next lowest or next highest value that is precisely representable in hardware).

To enable the cache allocation control circuitry 407 to make allocation decisions to avoid the maximum associativity threshold being exceeded, allocation tracking information 412 is maintained based on previous allocation decisions and based on evictions from the cache, to track how many entries, and which particular entries, of the cache have been allocated for use by a given partition. Hence, the allocation control circuitry maintains the allocation tracking information 412, indicating separately for the respective sets of the set-associative cache, how many ways of that set have been allocated for information associated with a given partition identifier.

Figure 7:
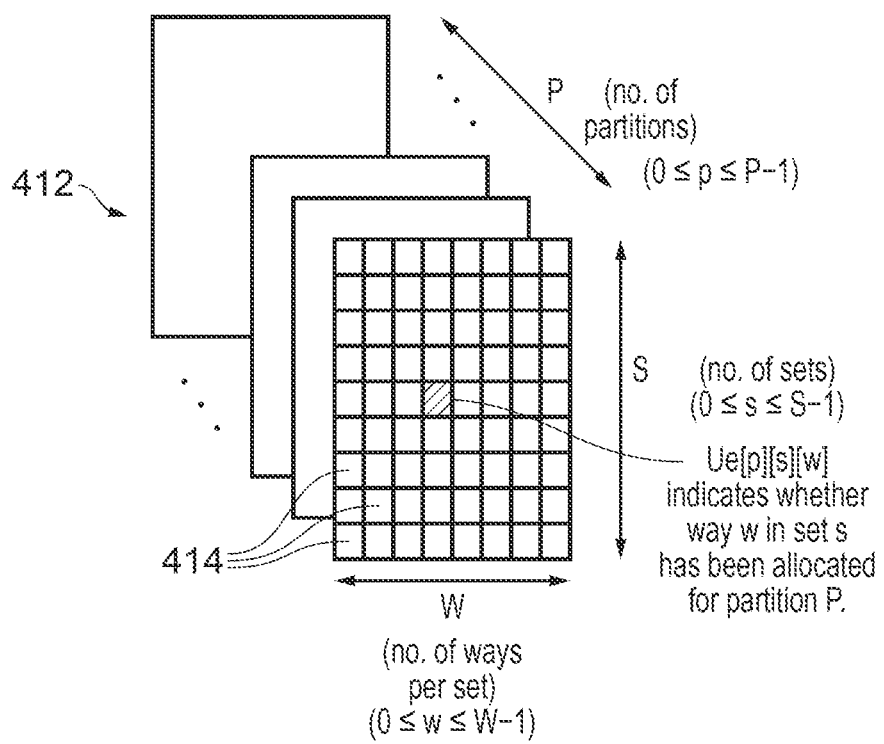
FIG. 7 shows an example of allocation tracking information.

As shown in FIG. 7, one way of implementing the allocation tracking information 412 can be to provide an allocation tracking structure which comprises a number of allocation tracking entries 414 which each correspond to a respective combination of a partition identifier p, a set s and a way w, where p, s, w extend over the total number of partitions P (again, with the same PARTID values in different partition ID spaces being regarded as different partitions), the total number of sets S and the total number of ways W respectively and a given tracking entry Ue[p][s][w] indicating whether way w in set s has been allocated for information associated with partition p. Hence, when a given entry of the cache is allocated for information for a particular partition p, the corresponding tracking entry for that partition associated with the allocated way in the corresponding set is set to a first value (e.g. 1). The tracking entry is cleared to a second value (e.g. 0) when information for a given partition is evicted, invalidated or replaced within the corresponding way of the corresponding set. Hence, this structure allows control of allocation to be performed as follows.

In the case of the set associative cache, the product of the number entries in the set and the fractional limit parameter could yield an exact integer or a product that has integer and fractional parts. To improve the overall regulation at the cache level, an additional product of the fractional part of the entries times limit product with the number of sets in the cache yields an integer part which is the number of sets that can use one more than the integer part of that set's associativity.

One particular example of use of the allocation tracking information 412 is illustrated below in mathematical notation:
S=number of associativity sets 104 in the cache 400;
W=number of entries (ways) in each associativity set
b=number of bytes in one entry.
C=total capacity of the cache=S*W*b
F[p]=fractional limit control parameter for the partition with partition ID=p If all sets are uniform, then the number of ways a given partition ID can allocate applies to all sets and is: Nw[p]=int(W*F[p]), where int(x) is x rounded to an integer (e.g. one approach could be to round towards 0, while other approaches may round to the nearest integer, or apply a round-towards-0 rounding for a lower portion of the fractional range of F[p] and apply a round-away-from-0 rounding for an upper portion of the fractional range).

The target associativity set (s) for a given access is chosen as a function of the address (a) of the cache request. The request also carries a partition identifier (p).
s=setmapping(a, S)
As explained above, the particular setmapping( ) function may vary from implementation to implementation, e.g. it could be extraction of a portion of bits from address a, or applying a hash function to an extracted portion of bits. The number of bits of address a used to determine the target set s may depend on the total number of sets S.

To perform the regulation, the mechanism controls allocations of new information into the cache (the behaviour on a cache lookup which does not need new allocation is independent of the partition ID or the corresponding cache maximum associativity value). This regulation augments the allocation and replacement behavior of the cache with additional limitation of the post allocation occupancy of the associativity set by the owning PARTID.

As shown in FIG. 7, in one example the allocation tracking information 412 can comprise a 1-bit flag 414 per cache entry in an associativity set per partition ID. Hence, flag Ue[p][s][w] indicates whether way w in set s has been allocated for information associated with partition p. This allows the cache allocation control circuitry 407 to count usage of entries by partition ID p in the associativity set s and also determine which of the entries in the set s that partition ID is using.

Ue[p][s]=booleanvector(U[p][s][for all w])
Uec[p][s]=countTrue(Ue[p][s])
If Uec[p][s]<(Nw[p]−1) then allocate_from (!Ue[p][s])
Else reuse one of P's current allocations by allocate_from (Ue[p][s])

Here, the function "allocate_from( )" may use any existing method to rank candidate entries such as LRU, RRIP or DRRIP. However, it is possible to modify the ranking by forming a mask based on the vector Ue[p][s] that indicates the current usage of entries within set s by the partition ID p. If the allocation would keep the partition ID's usage under the goal, the allocation is made from entries that are not currently used by the partition ID. If the allocation would go over the goal, then the allocation is made from the entries currently used by the partition ID. Alternatively, other examples could use the mask to influence allocations when the allocation would go over the goal, but in the case when allocation would not go over the goal, the "allocate_from( )" function may select any way w within set s as the replacement entry based on the replacement policy information, regardless of whether the replacement way is already allocated for partition ID p or another partition ID.

If an entry in the cache is invalidated, evicted or replaced, that entry's flag in Ue[p][s][w] is set to False (e.g. 0). On an invalidation, eviction or replacement, the cache allocation control circuitry 407 knows the set (s) and way (w) that are being removed, but may not know the partition ID (p). Since the number of partition ID may be very large (e.g. thousands), it can be costly in terms of power consumption for an implementation to iterate through all partition IDs to set to False Ue[for all p][s][w], even though it may be possible to set the flags to False for all of the flags in the Boolean array sliced by s and w in parallel in some hardware organizations.

Figure 8:
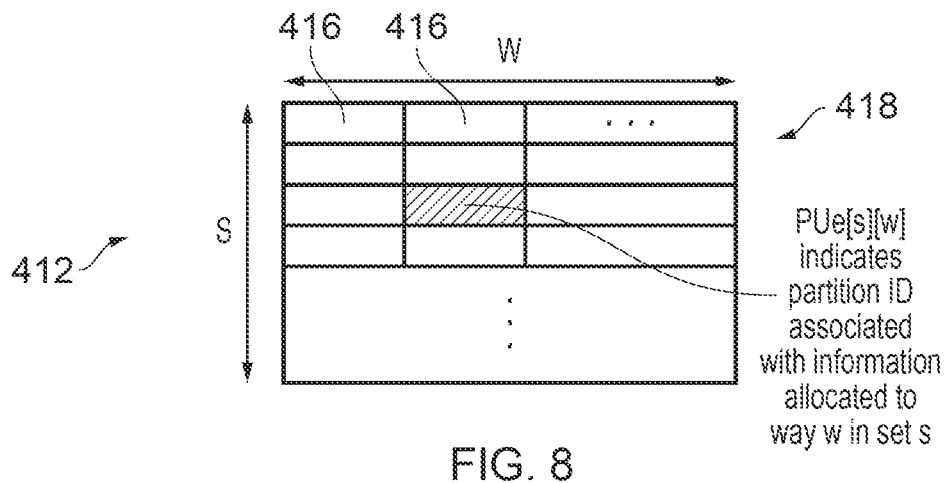
FIG. 8 shows an example of a partition identifier structure comprising partition identifier entries which indicate the partition identifiers associated with information stored in corresponding set/way combinations of the set-associative cache.

Another solution may be easier and less expensive. As shown in FIG. 8, the allocation tracking information 412 may also include a partition identifier structure 418 which comprises partition identifier entries PUe[s][w] 416. This organization stores the partition ID p for each cache entry 404 in partition identifier entry PUe[s][w]=p. PUe[s][w] is an unsigned integer representing the partition ID at its implemented width, e.g. 8 to 16 bits.

Since p might take any value representable in PUe[s][w], the partition identifier structure 418 could also specify a validity bit per entry:
PUev[s][w]=boolean
Then Ue[p][s] becomes:
Ue[p][s]=booleanVector(for all w(PUev[s][w] && PUe[s][w]==p))

This makes the maintenance easy as the invalidation is just the setting of PUev[s][w]=False. For new allocations, or the replacement stage of the eviction followed by replacement, the new PARTID is stored into PUe[s][w] and PUev[s][w] is set to true. Storing the partition ID for each entry in the cache is also useful for other memory partitioning functions such as transmitting the partition ID of the entry when it is evicted, so that a downstream cache or other memory system component can also partition resource.

When the product of the W*F[p] is not exactly an integer, the scheme above limits the total cache capacity used by the partition ID p, to less than the fraction F[p] of the total capacity. In implementations which include measures to correct this, an additional step can be used to correct this missing fraction of the capacity by permitting a limited number of sets to allocate an additional way.

The number of sets that can contain an extra Nw[P]+1 allocation in each are:
Ns[p]=int(S*frac(W*F[p]))

To track this, we can provide a set tracking structure Xs[p][s]=Boolean, where Xs indicates that set s has an extra way allocated for handling information for partition ID p.

The regulator 407 keeps a count of total extra allocations per partition:
Xt[p]=countTrue(Xs[p][over all s])
If Xt[p]<Ns[p] then a new request for p can allocate Nw[p]+1 entries in any set
Else a new request for p can allocate Nw[p] entries in any set.

Figure 9:
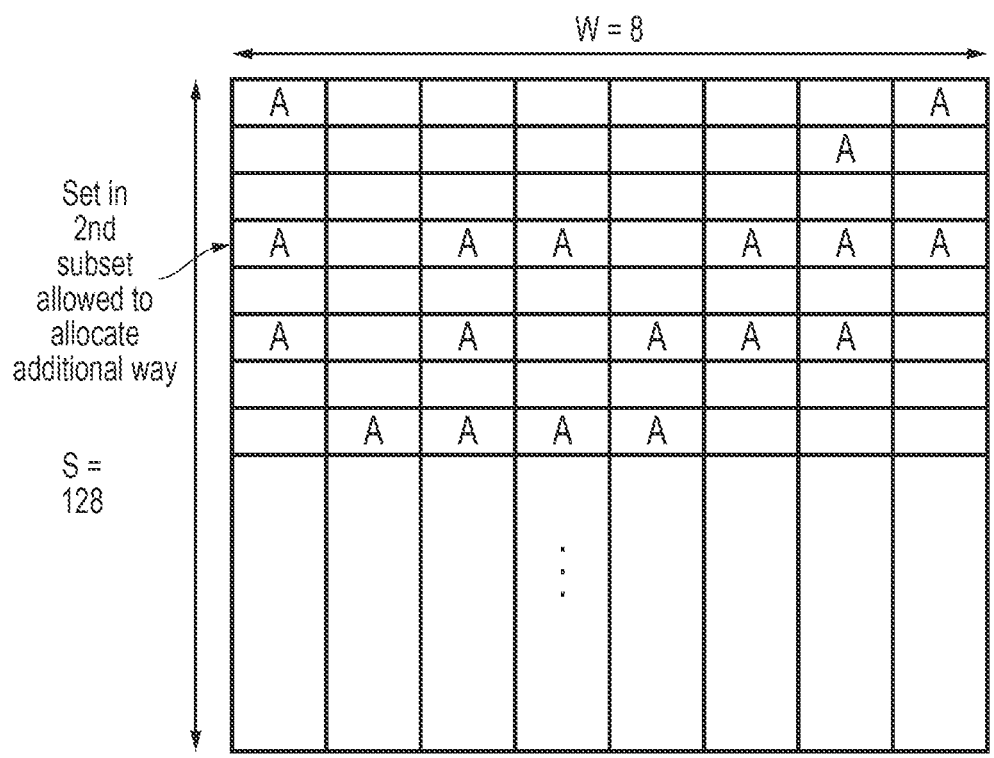
FIG. 9 schematically illustrates an example where, for a given partition identifier, a second subset of sets of the set-associative cache are allowed to allocate an additional way compared to a first subset of sets.

FIG. 9 shows a worked example of allocating an additional way per set for a subset of the sets. In this example the maximum associativity fraction for a given partition A is defined as F[A]=67% and so one would expect up to 67% of the entries to be able to be allocated for partition A, but as this example of a cache is an 8-way set-associative cache, the integer portion of multiplying the number of ways per set by the fraction is 5 and so if no support is provided for allocating additional ways based on the fractional portion of the product of the number of ways W and cache maximum associativity fraction F[A], this may result in the total fraction of cache capacity allocatable to partition A being reduced to 5/8=62.5% so that the effective fraction of cache capacity seen by partition A may be less than that expected.

To improve regulation and more closely approximate the fraction indicated, some sets are allowed to allocate a sixth way. In this example the total number of sets S=128, and so the product of S and the fractional part of W*F[A] is 42. Hence, in this example a maximum of 42 sets are allowed to be in the second subset which is allowed to allocate an additional sixth way beyond the threshold of 5 ways indicated by the integer part of W*F[A]. Note that as different partitions may have different associativity fractions F[p], for allocations into the same cache, the number of ways in the second subset for one partition may differ from the number of ways in the second subset for another partition. For some partitions, if they have defined a fraction which when multiplied by W gives an exact integer, then there may be no ways in the second subset and each set may, for that partition, be restricted to allocating a number of ways corresponding to the integer part of W*F[p]. Also, which particular sets are selected as the sets allowed to be allocated an additional way may vary depending on which sets need the additional entry, which may depend on the pattern of cache access requests received.

Rather than allocating a fixed subset of sets as the second subset of sets allowed to allocate an additional way, sets may be assigned to the second subset dynamically as need arises.

Figure 10:
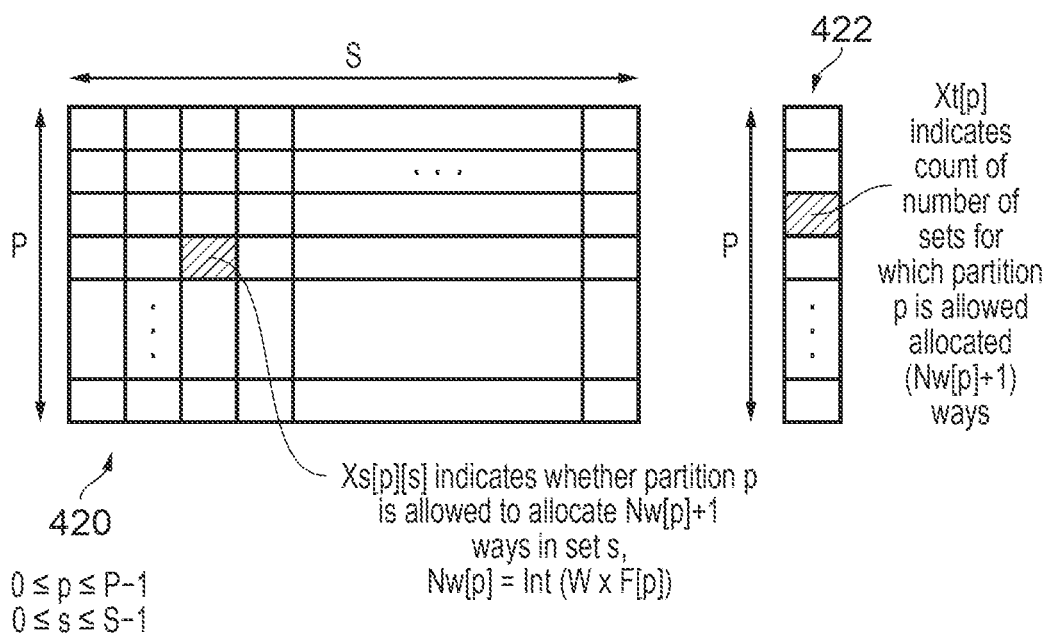
FIG. 10 illustrates an example of set tracking information for tracking which sets of the set-associative cache are in the second subset of sets.

To track this, as shown in FIG. 10 a way tracking structure 420 is maintained having a number of way tracking entries Xs[p][s] which each correspond to a given combination of partition identifier p and set s (again with p iterating over each partition up to the maximum number of partitions P and s iterating over each set up to the maximum number of sets S). Xs[p][s] indicates whether, for requests associated with partition p, those requests are allowed to allocate an additional way (up to Nw[p]+1 ways) within set s, where Nw[p] correspond to the integer part of the product of the number of ways per set W and the maximum associativity fraction F[p] selected for partition p. Hence, if a given set has already allocated the Nw[p] ways for partition p and then another request to allocate further information for partition p is received which maps onto the same set that already has the Nw[p] ways allocated within that set, provided that the total number of sets that have been allocated the additional way does not exceed S*frac(W*F[p]), that set may then be allocated into the second subset and assigned the additional way and the way tracking structure 420 may have the corresponding entry for partition p and the selected set s updated to indicate that this set is allowed to allocate the additional way. Although the total number of sets for a given partition assigned to the second subset could be determined on the fly by counting the number of tracking entries Xs[p][for all s] set to a first value (e.g. 1) for the given partition, optionally some implementations may also use a separate set count structure 422 which has the number of entries Xt[p] each corresponding to a given partition p and indicating the count of the number of sets for which the partition p is allowed to allocate Nw[p]+1 ways (i.e. tracking the number of sets allocated to the second subset for partition p).

This approach of enabling allocation of an additional way to bring the total fraction of cache capacity seen by a partition closer to the fraction indicated by the maximum associativity is useful, but not essential, and other approaches may simplify the hardware design by simply restricting the number of ways allocatable within one set to the integer part of W*F[p].

Example Flow Diagrams

Figure 11:
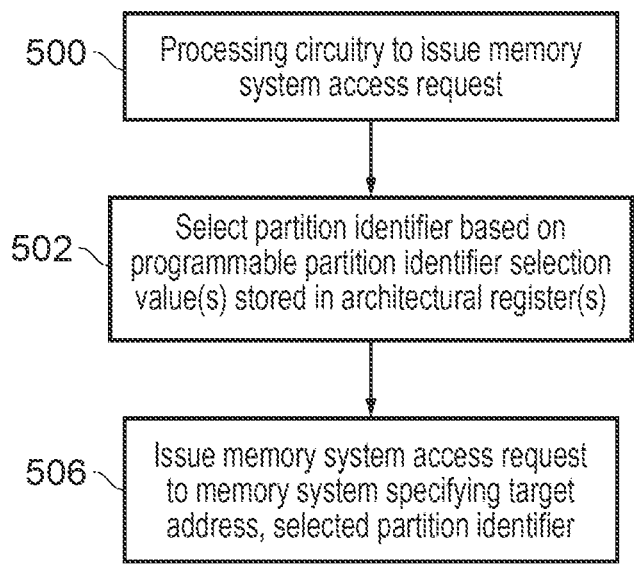
FIG. 11 is a flow diagram illustrating issuing of a memory system access request specifying a partition identifier.

FIG. 11 is a flow diagram illustrating issuing of a memory system access request by the processing element 6. At step 500 the processing circuitry 310 requests issuing of a memory system access request, which could be an instruction fetch request or a data access request for example. At step 502, the partition ID selection circuitry 332 (and in some cases partition ID space selection circuitry 334) selects a partition ID (again encompassing the partition ID space indicator in examples which implement multiple partition spaces) based on programmable partition identifier selection values stored in architectural registers 312 of the processing element 6. For example this may be based on the MPAM control registers 330 as described earlier. The selection of the partition identifier may also depend on the current operating state 315 of the processing element such as the exception level or current domain of operation. At step 506 the processing element 6 issues a memory system access request to the memory system specifying a target address (PA) and the selected partition ID. This access request can be sent to various memory system components including caches, interconnects, memory controllers etc.

Figure 12:
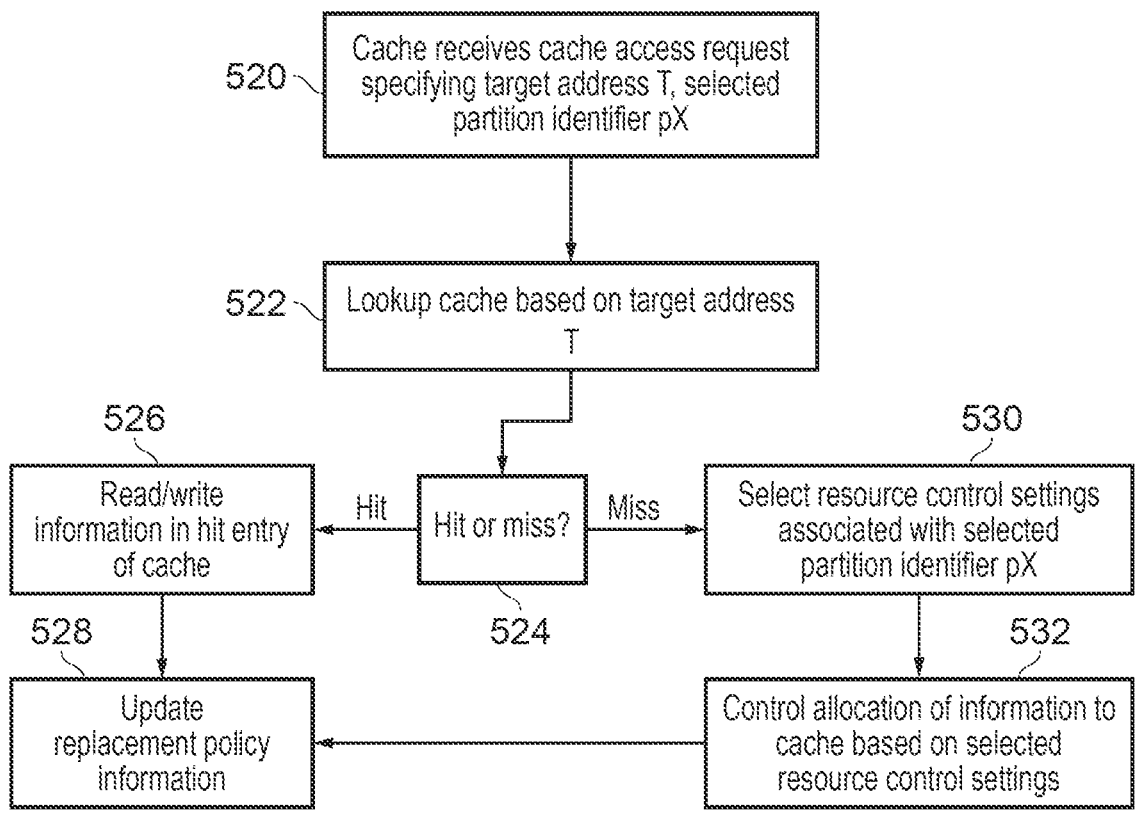
FIG. 12 illustrates processing of a cache access request by the cache.

FIG. 12 is a flow diagram showing processing at a cache 400 when the memory access request is directed to a cache and so is treated as a cache access request. At step 520 the cache 400 receives the cache access request specifying a given target address T and a selected partition identifier pX.

At step 522 the cache is looked up by cache lookup control circuitry 405 based on the target address T to identify whether any of the cache entries which are capable of storing information corresponding to target address T have their tag set to indicate that the information stored in that entry does correspond to target address T. At step 524 the cache lookup control circuitry 405 determines whether the lookup hit or missed in the cache. If one of the looked up entries of the cache was found to correspond to target address T then a hit is identified and at step 526 a read or write of information in the hit entry of the cache matching the target address T is performed. At step 528 replacement policy information 410 may be updated in response to the cache access. For example the replacement policy update may follow any known replacement policy scheme such as round robin, LRU, RRIP, DRRIP, etc.

If at step 524 a miss was identified then at step 530 the resource control setting selection circuitry 401 selects the resource control settings associated with the selected partition identifier pX and at step 532 the cache allocation control circuitry 407 controls allocation of a cache entry for storing information corresponding to target address T, with the allocation controlled based on the selected resource control settings.

Figure 13:
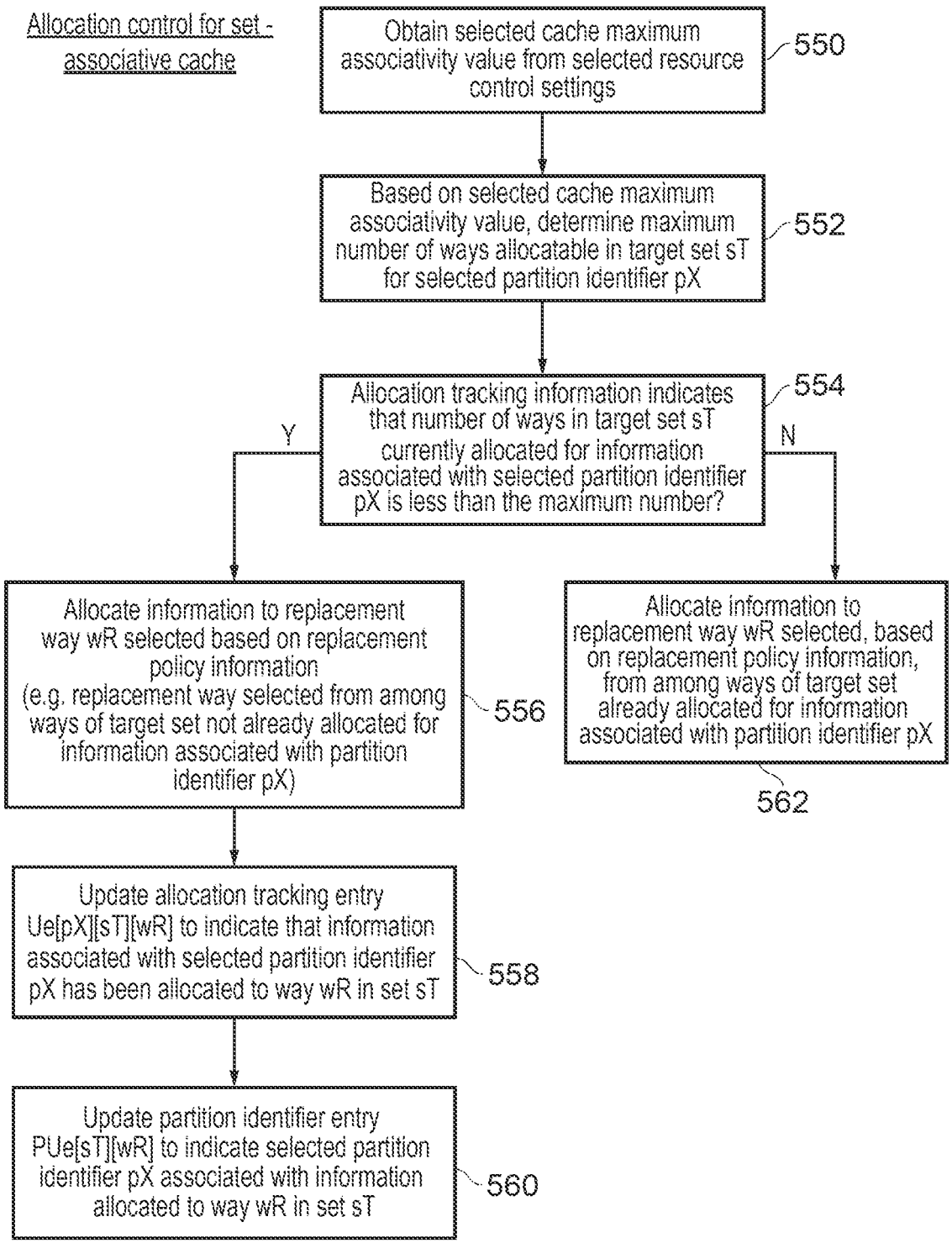
FIG. 13 is a flow diagram illustrating allocation control for controlling allocation of new information to the cache, when the cache is a set-associative cache.

FIG. 13 shows a flow diagram illustrating the control of allocation at step 532 of FIG. 12 in a case where the cache is a set-associative cache and the resource control settings for partition identifier pX have been set to specify that a cache maximum associativity value is to be used for controlling cache allocation. Hence, at step 550 the selected cache maximum associativity value selected from settings table 402 for the current partition pX is obtained and at step 552, based on the selected cache maximum associativity value, the cache allocation control circuitry 407 determines a maximum number of ways allocatable in a target set sT corresponding to target address T for the selected partition identifier pX.

Figure 14:
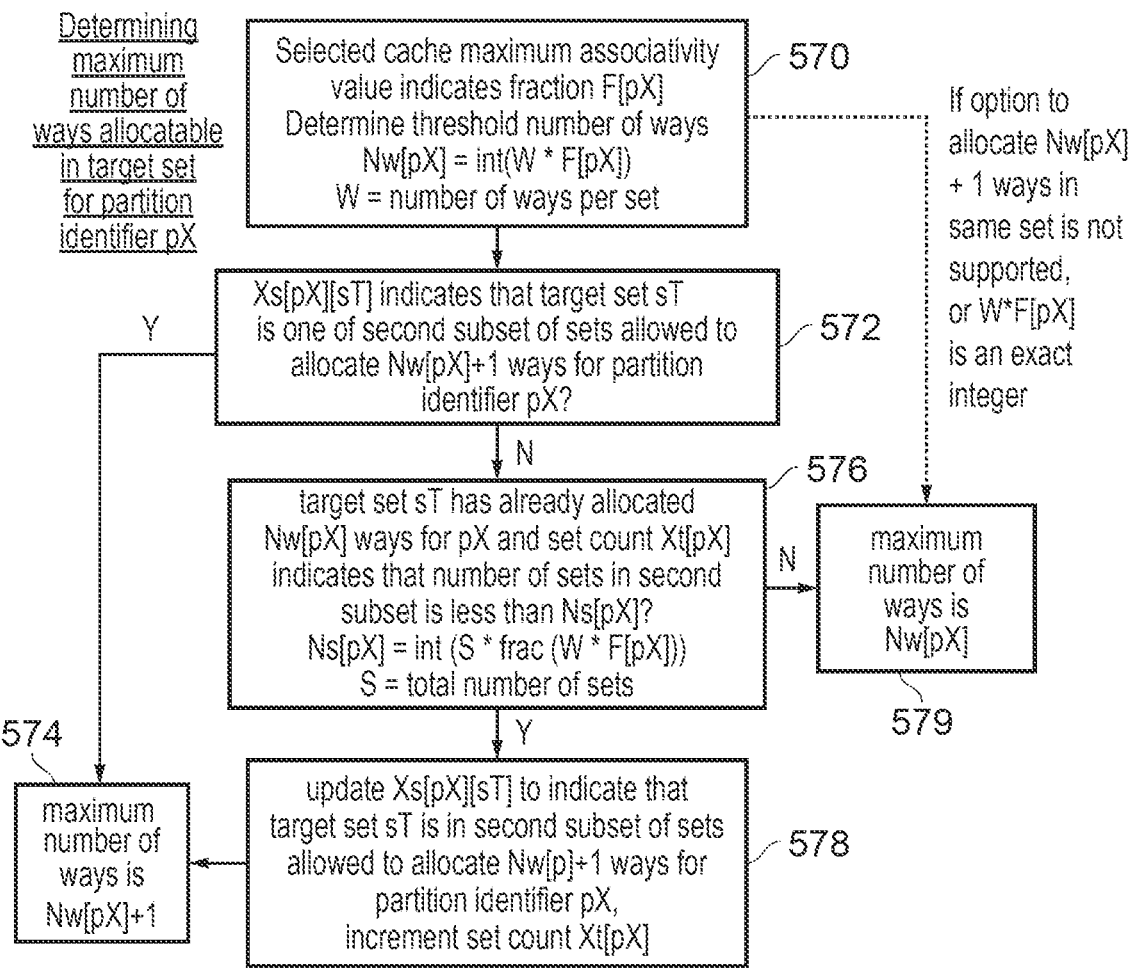
FIG. 14 is a flow diagram showing in more detail steps for determining a maximum number of ways allocatable in a target set for a particular partition identifier.

FIG. 14 shows in more detail steps for determining the maximum number of ways at step 552 of FIG. 13. In this example the selected cache maximum associativity value indicates a certain fraction F[pX]. At step 570 the cache allocation control circuitry 407 determines a threshold number of ways Nw[pX] according to the integer portion of W*F[pX], where W is the number of ways per set in cache 400.

At step 572 the cache allocation control circuitry 407 determines based on the set tracking information Xs[pX][sT] 420 whether the target set sT is one of the second subset of sets allowed, for partition identifier pX, to allocate up to Nw[pX]+1 ways in the same set. If so then at step 574 the maximum number of ways identified for partition pX is Nw[pX]+1.

If target set sT is not yet one of the second subset of sets then at step 576 it is determined whether the target set sT has already allocated Nw[pX] ways for partition identifier pX and the set count 422 Xt[pX] corresponding to partition pX indicates that the number of sets in the second subset is less than Ns[pX], where Ns[pX] corresponds to the integer part of the product of the total number of sets S with the fractional part of W*F[pX]. If the target set sT has already allocated the threshold number of ways for partition identifier pX and the number of sets in the second subset has not yet reached the maximum number of sets allowed then at step 578 target set sT can become one of the second subset of sets (and the corresponding set tracking entry 420 corresponding to partition pX and set sT is updated to indicate that target set sT is in the second subset of sets allowed to allocate an additional way for partition identifier pX), and also the set count 422 corresponding to partition pX may be incremented. At step 574 it is determined that the maximum number of ways allowed to be allocated in set sT for partition pX is the increased threshold of Nw[pX]+1.

On the other hand, if at step 576 it was determined that the number of sets allocated for partition pX in target set sT has not yet reached the threshold number of ways Nw[pX] (so there is no need to add it into the second subset), or target set sT has already allocated the threshold number of ways but the number of sets in the second subset has already reached the maximum Ns[pX], then it is not possible to allocate an additional way in target set sT for partition pX, and so at step 579 the maximum number of ways is determined as equal to the threshold number of ways Nw[pX], which corresponds to the integer part of the product of the number of ways per set W and the fraction F[pX].

In some implementations, the cache may not support the ability to allocate an additional way for a second subset of sets and in this case steps 572, 576, 578, 574 may not be implemented, and instead regardless of the current number of ways allocated for pX in set sT, the maximum number of ways could be set as Nw[pX] as shown in the dotted line extending from step 570 to 579. Also, if the product of the number of ways per set W and the cache maximum associativity fraction F[pX] is an exact integer then some implementations may skip performing steps 572, 576, 578, 574 and may instead proceed from step 570 to step 579 because there will be no fractional portion of this product in that case and so the maximum number of sets allowed in the second subset for that particular partition having that particular fraction defined may be 0, so skipping these steps can save resource by avoiding unnecessary comparisons.

Hence, based on FIG. 14 the maximum number of ways could be determined either as Nw[pX] or as Nw[pX]+1, and which option is selected may vary for different sets for the same partition identifier and vary between different partition identifiers depending on the fraction F[p] defined for each partition identifier.

Returning to FIG. 13, regardless of how the maximum number is determined, at step 554 the maximum number of ways allowed to be allocated in target set sT for selected partition identifier pX is compared with the allocation tracking information indicating the number of ways in target set sT currently allocated for information associated with selected partition identifier pX. For example, this could be based on a count of the number of allocation tracking entries 414 in the vector Ue[pX][sT] that are set to 1 (or alternatively a separate count value per partition/set combination may be maintained to avoid the need to compute the sum of set Ue[pX][sT] bits). The allocation control circuitry 407 determines whether the number of ways currently allocated is less than the maximum number.

If the number of ways currently allocated in set sT for information associated with partition ID pX is less than the maximum number, then at step 556 the information associated with the current cache access request is allocated to a replacement way wR which is selected based on the replacement policy information 410. When the current allocation for partition pX in set sT has not yet reached the maximum then the replacement way could be selected as any of the ways of the corresponding set sT, so it could be either an entry already allocated for information associated with partition identifier pX or an entry not already allocated for information associated with partition identifier pX. Optionally, some implementations may choose to weight the replacement selection in this case so as to favour selection of an entry not already allocated for information associated with partition identifier pX, for example by applying a mask using the vector Ue[pX][sT] extracted from the allocation tracking information 412 (the mask may be inverted relative to the stored values of Ue[pX][sT] to mask out the already used ways from being selected based on the replacement policy) and then the replacement policy information is used to select the replacement way from among the remaining ways not already allocated for information associated with partition identifier pX. However, this is not essential and other implementations could make a free choice based on the replacement policy information which is unconstrained by the allocation tracking information. Note that regardless of whether such masking is applied in a given implementation, at step 556, in the case where none of the ways of set sT have already been allocated for information associated with partition identifier pX, then selection of the replacement way is unconstrained by the allocation tracking information or the cache maximum associativity value, as any of the ways of set sT would be able to be selected, so that the replacement policy indicated by the replacement policy information can be fully observed.

At step 558 the allocation tracking entry Ue[pX][sT][wR] 414 which corresponds to the selected partition ID pX, the target set sT and the replacement way wR is updated to indicate that information associated with that partition ID pX has been allocated to the replacement way wR in the target set sT. At step 560 the partition identifier structure 418 shown in FIG. 8 can also be updated so that the corresponding partition identifier entry PUe[sT][wR] 416 for target set sT and replacement way wR is updated to indicate the selected partition ID pX. This partition identifier entry could be stored in a dedicated partition ID tracking structure or could be stored within the tag portion 110 of the cache entries.

On the other hand, if at step 554 it is determined that the allocation tracking information indicates that the number of ways currently allocated for partition ID pX has reached the maximum number determined at step 552, then at step 562 the replacement way wR is selected, based on the replacement policy information 410, from among the ways of the target set which the allocation tracking information 412 indicates as already being allocated for information associated with partition ID pX. At step 562 it is not allowed to allocate, as the replacement way wR, an entry which is indicated as being invalid or already allocated for information associated with a different partition ID other than pX. This ensures that the software associated with partition ID pX cannot be allocated a number of ways which exceeds the maximum defined by the cache maximum associativity value. For example, a mask may be constructed based on the vector Ue[pX][sT] so that the ways allowed to be selected are those which are already allocated for partition pX, and then this mask may be used to weight the replacement decision so that the replacement policy information 410 is used to prioritise selection of the replacement way among those ways indicated by the mask as being allowed to be selected because they are already allocated for pX.

It will be appreciated that FIGS. 13 and 14 show one way of controlling the allocation, but similar functions could be achieved by a different sequence of steps. Steps shown in FIGS. 13 and 14 could be reordered or performed in parallel rather than the exact sequence shown. For example, the steps shown in FIG. 14 for considering whether an additional way may be allocated for a given set in the second subset could be performed after step 554 of FIG. 13 only in the case where it is determined that the current allocation has not yet reached the normal maximum threshold of Nw[pX], to avoid needing to access the set tracking information in cases where the maximum allocation has not yet reached the normal threshold.

Figure 15:
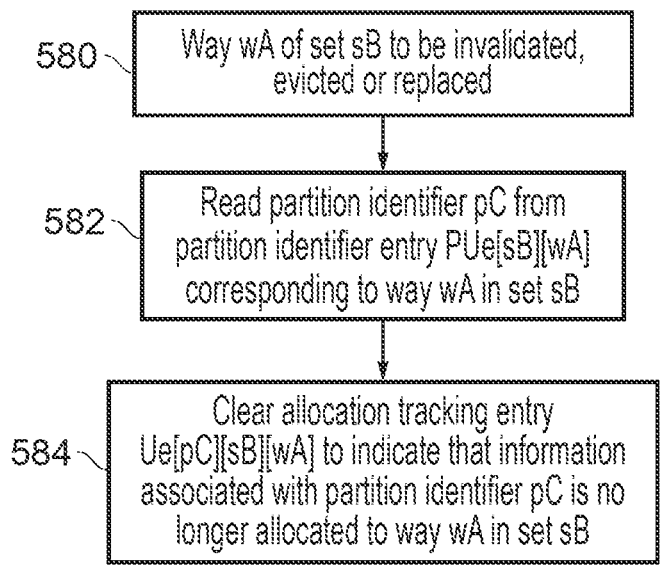
FIG. 15 is a flow diagram showing steps performed when an entry of the cache is to be invalidated, evicted or replaced.

FIG. 15 is a flow diagram showing control of eviction, replacement or invalidation of an entry in way wA of set sB of the set-associative cache 400. When at step 580 it is determined that way wA of set sB is to be invalidated, evicted or replaced, then at step 582 the corresponding partition ID entry PUe[sB][wA] 416 corresponding to the invalidated, evicted or replaced entry is accessed and the partition ID pC associated with the information in that entry is read out. At step 584 the read partition ID pC is used to clear the allocation tracking entry Ue[pC][sB][wA] 414 corresponding to the combination of partition ID pC, set sB and victim way wA to indicate that information associated with partition ID pC is no longer allocated to way wA in set sB. With this approach clearing a single allocation tracking entry 414 is enough to reflect the invalidation or eviction (on a replacement where the information is being replaced with information associated with a different partition identifier pD, then also the entry 414 Ue[pD][sB][wA] associated with that partition ID may need to be set). This technique avoids needing to clear all of the tracking entries Ue[for all p][sB][wA] 414 for different partition IDs corresponding to way sB and set wA on an invalidation, eviction or replacement, which would be expensive as there could be a large number of different partition ID values.

Figure 16:
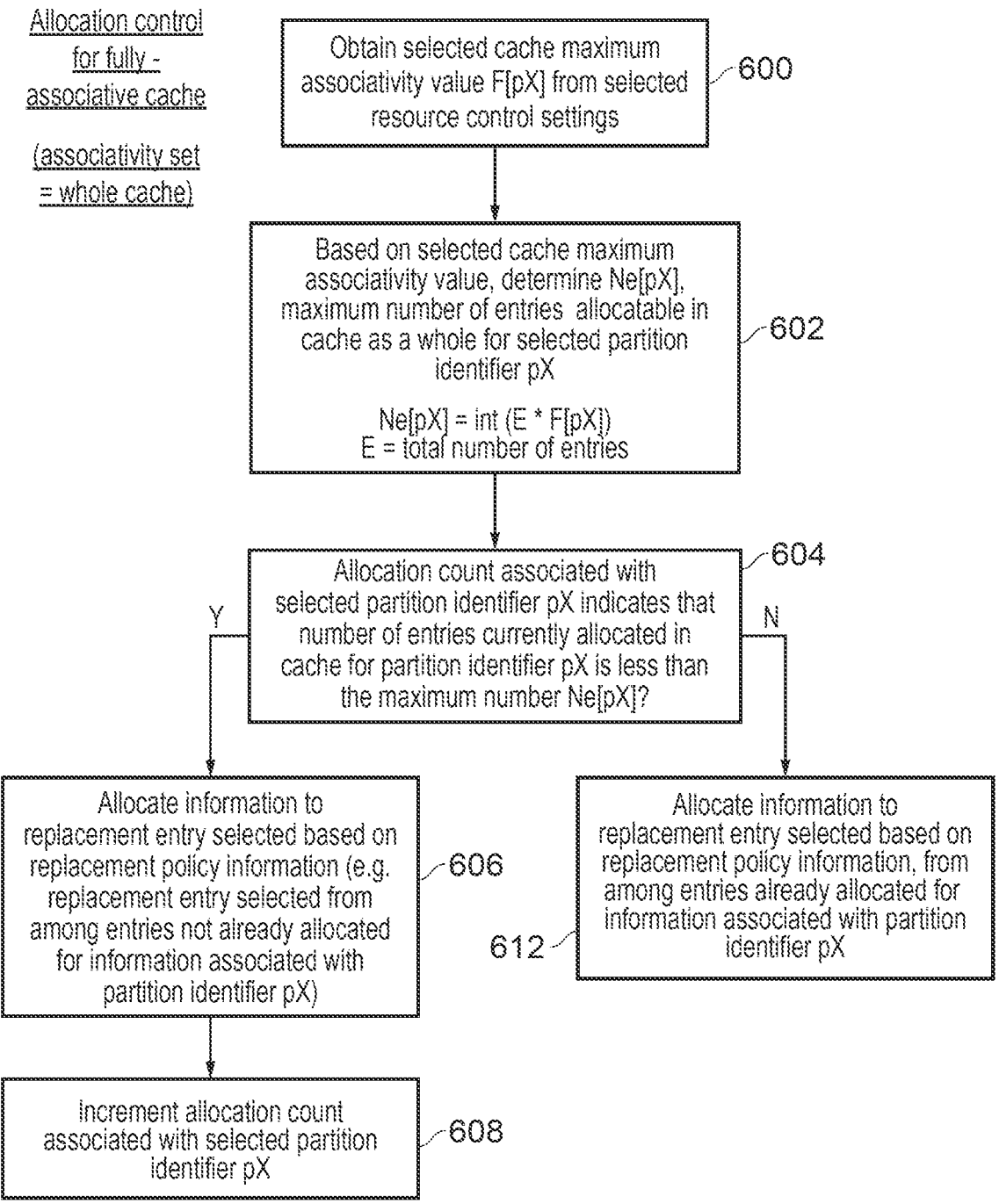
FIG. 16 shows control of allocation of new information to the cache when the cache is a fully-associative cache.

FIG. 16 is a flow diagram showing how the cache maximum associativity value may be used when the memory access request is received by a fully-associative cache for which the associativity set is the whole cache capacity. For the fully-associative cache the cache lookup process may still be as shown in FIG. 12, but the allocation control at step 532 may be performed as shown in FIG. 16 instead of as in FIG. 13 for the set-associative cache. At step 600 the selected cache maximum associativity value F[pX] is obtained from the selected resource control settings, with the selection being based on the partition ID obtained at step 530 of FIG. 12. At step 602, based on the selected cache maximum associativity value, the fully-associative cache determines a maximum number of entries Ne[pX] allowed to be allocated across the cache as a whole for information associated with selected partition ID pX. The maximum number of entries is defined as the integer part of the product of the total number of entries E and the cache maximum associativity fraction F[pX]. At step 604 an allocation counter indicating the current number of entries allocated in cache for partition ID pX is compared with the maximum number Ne[pX]. If the current allocation count indicates that the number of entries allocated for partition ID pX is less than the maximum number then at step 606 the allocation control circuitry selects a replacement entry based on the replacement policy information, which can either be unconstrained by the current cache allocation tracking, or in some cases may favour replacement of an entry not already allocated for information associated with partition ID pX (if tracking information tracking which partition ID corresponds to each entry is available), but in general it is allowed to make the allocation decision so that the number of entries allocated across the cache as a whole increases for partition ID pX. At step 608 an allocation counter associated with selected partition ID pX may then be incremented to indicate that an additional entry has been allocated for that partition.

If at step 604 it was determined that the allocation counter indicates that the current number of entries for partition ID pX has reached the maximum number Ne[pX], then at step 612 the replacement is selected from among entries already allocated for information associated with partition ID pX and the information for the current cache access request is then allocated to that replacement entry. Hence in this case it is not allowed to allocate an entry which was not already allocated for partition ID pX, to avoid that partition gaining more than its maximum fraction of cache capacity.

Hence it can be seen that FIGS. 13 and 16 allow the same cache maximum associativity value F[pX] to be interpreted in different ways by a set-associative cache and a fully-associative cache respectively so that in either case the effective fraction of cache capacity seen by the partition may be maintained to be no greater than the product of the total number of entries in the cache and the fraction, but in the case of a set-associative cache an additional restriction is imposed where the fraction of ways within the same set that may be allocated is restricted separately for each set to avoid the partition monopolising all the ways in one set. This would not be possible with the overall cache capacity control described earlier.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to perform data processing;
at least one architectural register to store at least one partition identifier selection value which is programmable by software processed by the processing circuitry;
a set-associative cache comprising a plurality of sets each comprising a plurality of ways; and
partition identifier selecting circuitry to select, based on the at least one partition identifier selection value stored in the at least one architectural register, a selected partition identifier to be specified by a cache access request for accessing the set-associative cache;
the set-associative cache comprising:
selecting circuitry responsive to the cache access request specifying the selected partition identifier to select, based on the selected partition identifier, a selected cache maximum associativity value associated with the selected partition identifier; and
allocation control circuitry to limit a number of ways allocated in a same set for information associated with the selected partition identifier to a maximum number of ways determined based on the selected cache maximum associativity value;
in which:
when new information is to be allocated to a target set of the set-associative cache in response to the cache access request, the allocation control circuitry is configured to select, from among the plurality of ways of the target set, a replacement way to be allocated with the new information; and when the selected cache maximum associativity value indicates that the maximum number of ways is greater than zero and less than a total number of ways in the target set, and none of the plurality of ways of the target set are already allocated for information associated with the selected partition identifier, the allocation control circuitry is configured to select which particular way of the target set is the replacement way unconstrained by the selected cache maximum associativity value.

2. The apparatus according to claim 1, in which the allocation control circuitry is configured to maintain allocation tracking information indicating, separately for respective sets of the set-associative cache, how many ways of that set have been allocated for information associated with a given partition identifier.

3. The apparatus according to claim 2, in which when the new information is to be allocated to the target set in response to the cache access request specifying the selected partition identifier and the allocation tracking information indicates that the number of ways of the target set allocated for information associated with the selected partition identifier has already reached the maximum number of ways determined based on the selected cache maximum associativity value, the allocation control circuitry is configured to select, as the replacement way, a way of the target set which is indicated by the allocation tracking information as already having been allocated for information associated with the selected partition identifier.

4. The apparatus according to claim 2, in which the allocation tracking information comprises a plurality of allocation tracking entries corresponding to respective combinations of partition identifier, set and way, where a given allocation tracking entry Ue[p][s][w] indicates whether way w of set s of the set-associative cache is allocated for information associated with partition identifier p.

5. The apparatus according to claim 4, in which the allocation control circuitry is configured to maintain a partition identifier structure comprising a plurality of partition identifier entries corresponding to respective combinations of set and way, where a given partition identifier entry PUe[s][w] indicates the partition identifier associated with information allocated to way w of set s of the set-associative cache; and in response to invalidation, eviction or replacement of information in way wA of set sB of the set-associative cache, the allocation control circuitry is configured to read a partition identifier pC from the partition identifier entry PUe[sB][wA] corresponding to way wA and set sB, and to clear the allocation tracking entry Ue[pC][sB][wA] corresponding to partition identifier pC, set sB and way wA to indicate that information associated with partition identifier pC is no longer allocated to way wA in set sB.

6. The apparatus according to claim 1, in which the selected cache maximum associativity value is programmable by software processed by the processing circuitry.

7. The apparatus according to claim 1, in which:
each set of the set-associative cache has W ways;
the selected cache maximum associativity value associated with the selected partition identifier p is programmable by software using a value having an encoding specifying a fraction F[p] between 0 and 1; and the allocation control circuitry is configured to determine the maximum number of ways based on W*F[p].

8. The apparatus according to claim 7, in which for at least a subset of sets of the set-associative cache, the allocation control circuitry is configured to determine the maximum number of ways corresponding to W*F[p], rounded to an integer.

9. The apparatus according to claim 7, in which:
for a first subset of sets of the set-associative cache, the allocation control circuitry is configured to determine the maximum number of ways as Nw[p], where Nw[p] corresponds to an integer portion of W*F[p], rounded towards 0; and for a second subset of sets of the set-associative cache, the allocation control circuitry is configured to determine the maximum number of ways as Nw[p]+1.

10. The apparatus according to claim 9, in which a number of sets in the set-associative cache is S; and
the allocation control circuitry is configured to restrict the second subset of sets to comprise a maximum of Ns[p] sets of the set-associative cache, where Ns[p] corresponds to an integer portion of S*frac(W*F[p]), rounded towards 0, and frac(W*F[p]) is a fractional portion of W*F[p].

11. The apparatus according to claim 9, in which the allocation control circuitry is configured to maintain set tracking information indicative of which of the sets of the set-associative cache are in the second subset of sets.

12. The apparatus according to claim 11, in which the set tracking information indicates which sets are in the second subset of sets separately for a plurality of different partition identifiers.

13. The apparatus according to claim 1, in which the allocation control circuitry is configured to select the replacement way based on replacement policy information other than the selected cache maximum associativity value.

14. The apparatus according to claim 13, in which the allocation control circuitry is configured to select the replacement way based on the replacement policy information and allocation tracking information indicating which ways of the target set have already been allocated with information associated with the selected partition identifier.

15. The apparatus according to claim 14, in which when allocation of an additional way in the target set for information associated with the selected partition identifier would be possible without causing a number of ways in the target set allocated for information associated with the selected partition identifier to exceed the maximum number of ways determined based on the selected cache maximum associativity value, the allocation control circuitry is configured to use the replacement policy information to select the replacement way from among ways of the target set not already allocated for information associated with the selected partition identifier; and when allocation of an additional way in the target set for information associated with the selected partition identifier would cause the number of ways in the target set allocated for information associated with the selected partition identifier to exceed the maximum number of ways determined based on the selected cache maximum associativity value, the allocation control circuitry is configured to use the replacement policy information to select the replacement way from among ways of the target set already allocated for information associated with the selected partition identifier.

16. The apparatus according to claim 1, comprising a fully-associative cache comprising a plurality of entries; the fully-associative cache comprising:

selecting circuitry responsive to the cache access request specifying the selected partition identifier to select, based on the selected partition identifier, the selected cache maximum associativity value associated with the selected partition identifier; and allocation control circuitry to limit a total number of entries of the fully-associative cache allocated for information associated with the selected partition identifier to a maximum number of entries determined based on the selected cache maximum associativity value.

17. The apparatus according to claim 1, in which a functional result of processing the cache access request is independent of the selected partition identifier.

18. A method comprising:

performing data processing using processing circuitry;

selecting, based on at least one partition identifier selection value stored in at least one architectural register, a selected partition identifier to be specified by a cache access request for accessing a set-associative cache, wherein the at least one partition identifier selection value is programmable by software processed by the processing circuitry, and the set-associative cache comprises a plurality of sets each comprising a plurality of ways;

in response to the cache access request specifying the selected partition identifier, selecting, based on the selected partition identifier, a selected cache maximum associativity value associated with the selected partition identifier; and limiting a number of ways allocated in a same set for information associated with the selected partition identifier to a maximum number of ways determined based on the selected cache maximum associativity value; in which:

when new information is to be allocated to a target set of the set-associative cache in response to the cache access request, a replacement way to be allocated with the new information is selected from among the plurality of ways of the target set, wherein when the selected cache maximum associativity value indicates that the maximum number of ways is greater than zero and less than a total number of ways in the target set, and none of the plurality of ways of the target set are already allocated for information associated with the selected partition identifier, selection of which particular way of the target set is the replacement way is unconstrained by the selected cache maximum associativity value.

* * * * *